US011441909B2

(12) United States Patent
Valdez et al.

(10) Patent No.: US 11,441,909 B2
(45) Date of Patent: Sep. 13, 2022

(54) SELECTIVE DISPLAY OF COMPLEX STRUCTURES IN A COMPUTER-IMPLEMENTED GRAPHICAL MAP DISPLAY

(71) Applicant: One Hundred Feet, Inc., Palo Alto, CA (US)

(72) Inventors: Edward Valdez, San Jose, CA (US); Nitin Gupta, Cupertino, CA (US); Akash Agarwal, San Jose, CA (US)

(73) Assignee: ONE HUNDRED FEET, INC., Palo Alto, CA (US)

( * ) Notice: Subject to any disclaimer, the term of this patent is extended or adjusted under 35 U.S.C. 154(b) by 178 days.

(21) Appl. No.: 17/022,418

(22) Filed: Sep. 16, 2020

(65) Prior Publication Data
US 2022/0003559 A1 Jan. 6, 2022

Related U.S. Application Data

(60) Provisional application No. 63/047,604, filed on Jul. 2, 2020.

(51) Int. Cl.
| | |
|---|---|
| *G06Q 10/04* | (2012.01) |
| *G01C 21/34* | (2006.01) |
| *G06F 3/0482* | (2013.01) |
| *G06F 3/0484* | (2022.01) |
| *G01C 21/36* | (2006.01) |

(Continued)

(52) U.S. Cl.
CPC ....... *G01C 21/3407* (2013.01); *G01C 21/362* (2013.01); *G01C 21/3661* (2013.01);
(Continued)

(58) Field of Classification Search
CPC .............. G01C 21/3407; G01C 21/362; G01C 21/3661; G06F 3/0482; G06F 3/0484;
(Continued)

(56) References Cited

U.S. PATENT DOCUMENTS 10,198,707 B1 * 2/2019 Bolton ............... G06Q 10/0837
2004/0176962 A1 9/2004 Mann
(Continued)

OTHER PUBLICATIONS

The International Searching Authority, "Search Report" in Application No. PCT/US21/38196, dated Sep. 30, 2021, 14 pages.
(Continued)

*Primary Examiner* — Haoshian Shih
(74) *Attorney, Agent, or Firm* — Hickman Becker Bingham Ledesma LLP; Malgorzata A. Kulczycka

(57) ABSTRACT

In some embodiments, a computer-based, pickup and delivery system is configured to perform a pickup/delivery route optimization and dispatch optimized route information to client applications. The optimization may include optimizing the routes for servicing multiple delivery and/or pickup stops. The optimization may also include optimizing the route navigation along the routes from one location to another. The optimized navigation may include generating a destination mapping throughout, for example, an apartment complex or a business park, and determining conveniently located parking to be used to park delivery vehicles, conveniently located staircases, conveniently located elevators, access codes to the secured gates and lockboxes, and the like.

20 Claims, 34 Drawing Sheets

(51) Int. Cl.
  *G06Q 10/06* (2012.01)
  *G06Q 50/28* (2012.01)
  *G06Q 10/08* (2012.01)

(52) U.S. Cl.
  CPC .......... *G06F 3/0482* (2013.01); *G06F 3/0484* (2013.01); *G06Q 10/047* (2013.01); *G06Q 10/06312* (2013.01); *G06Q 10/0832* (2013.01); *G06Q 10/08355* (2013.01); *G06Q 50/28* (2013.01)

(58) Field of Classification Search
  CPC ........... G06Q 10/047; G06Q 10/06312; G06Q 10/0832; G06Q 10/08355; G06Q 50/28
  See application file for complete search history.

(56) References Cited

U.S. PATENT DOCUMENTS

| | | |
|---|---|---|
| 2005/0165629 A1 | 7/2005 | Bruns |
| 2006/0184403 A1* | 8/2006 | Scott ...................... G06Q 99/00 705/338 |
| 2007/0030724 A1 | 2/2007 | Hosomi |
| 2008/0275643 A1 | 11/2008 | Yaqub |
| 2022/0004942 A1 | 1/2022 | Gupta et al. |
| 2022/0044198 A1* | 2/2022 | Meister ............ G06Q 10/08355 |

OTHER PUBLICATIONS

The International Searching Authority, "Search Report" in Application No. PCT/US21/37257, dated Sep. 30, 2021, 12 pages.

* cited by examiner

SELECTIVE DISPLAY OF COMPLEX STRUCTURES IN A COMPUTER-IMPLEMENTED GRAPHICAL MAP DISPLAY

FIELD OF THE DISCLOSURE

One technical field of the present disclosure relates to computer-implemented vehicle routing methods including the grouping of physical addresses based on semantic connections between the addresses. Another technical field relates to optimizing routes that include the addresses that are grouped based on various criteria including the semantic connections.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Businesses providing delivery services by vehicle are rapidly growing and evolving. Reliable services are in a high demand, especially when the dependability, accuracy and timeliness are particularly important. The reliable services may include fulfilling the requests for the same-day-deliveries or time-sensitive-deliveries. To meet the customers' expectations, drivers of the delivery service companies are expected to make, for example, within-an-hour-deliveries of medications regardless of how difficult it is to find the delivery destinations.

To meet the increasing expectations of the customers, delivery service companies usually rely on global positioning system (GPS) based technologies and GPS-based navigation systems. The systems often rely on satellite maps and geographic maps that are generally available to the public.

However, sometimes the maps lack the required accuracy and details. For example, some maps may not be updated in real time, may not reflect temporary road closures, or may not capture information about the construction zones or traffic congestions. Furthermore, they may fail to provide accurate navigation instructions within dense physical structures such as apartment complexes, business parks, or residential subdivisions.

SUMMARY

The claims may serve as a summary of the invention.

DETAILED DESCRIPTION

Figure 1A:
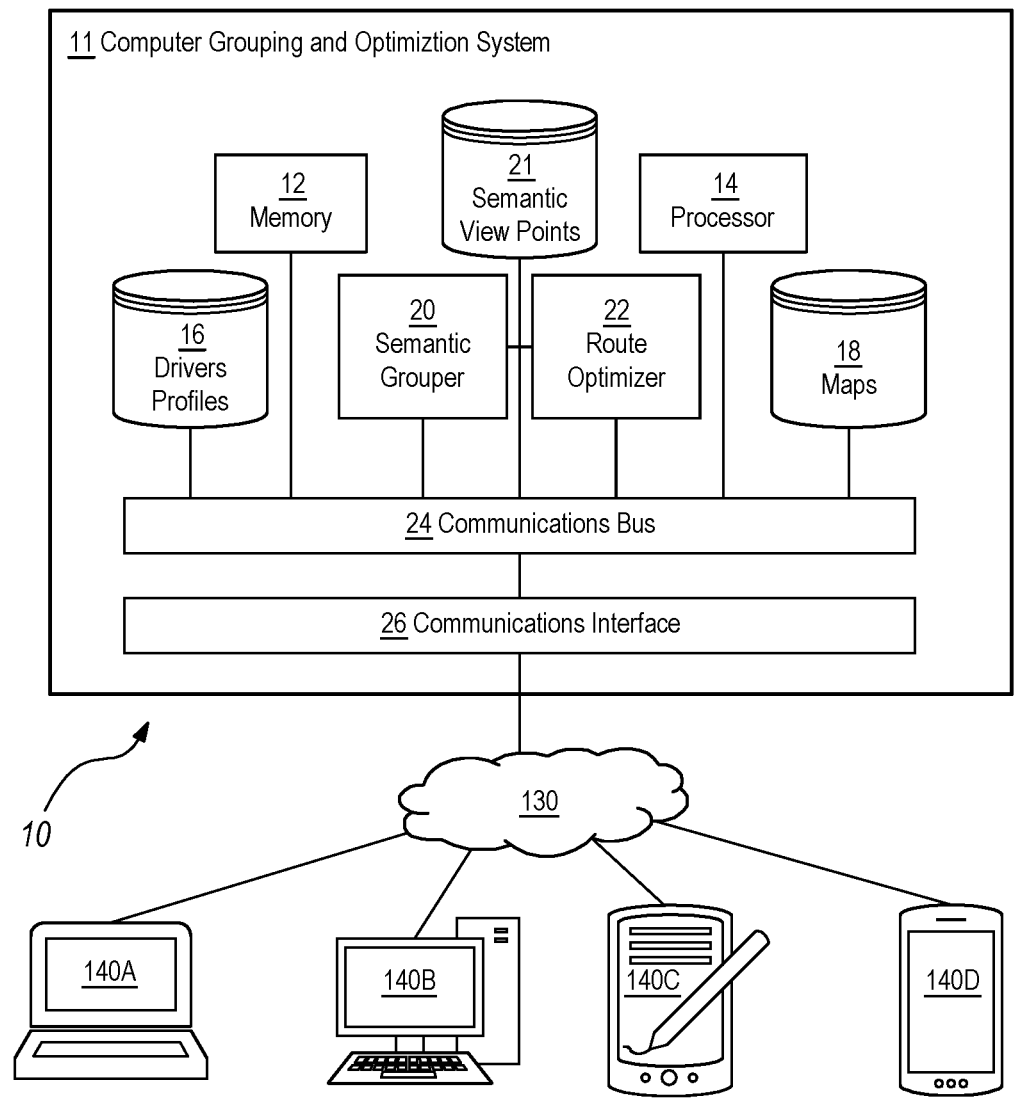
FIG. 1A is a block diagram showing an example computer grouping and optimization system for providing a platform for an address grouping based on semantic connections and for a route optimization.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. ROUTE-OPTIMIZED PICKUP AND DELIVERY SYSTEM
    2.1. COMPUTER GROUPING AND OPTIMIZATION SYSTEM
        2.1.1. SEMANTIC GROUPING UNIT
            2.1.1.1. SEMANTIC WAYPOINTS
            2.1.1.2. SEMANTIC GROUPING
        2.1.2. ROUTE OPTIMIZER
        2.1.3. INTERFACES
        2.1.4. USER DEVICES
    2.2. EXAMPLE GRAPHICAL USER INTERFACES
        2.2.1. EXAMPLE DASHBOARDS
        2.2.2. EXAMPLE MAPS
        2.2.3. EXAMPLE ROUTE DETAIL VIEWS
    2.3. SETTINGS, PERSONALIZATION AND SUPPORT
        2.3.1. PROFILE SETTINGS
        2.3.2. NAVIGATION SETTINGS
        2.3.3. SUPPORT SETTINGS
    2.4. EXAMPLE MAPS
        2.4.1. GEOGRAPHICAL MAPS
        2.4.2. SATELLITE MAPS
    2.5. POINT-TO-POINT DELIVERY
3. ROUTE GROUPING AND OPTIMIZATION
    3.1. OPTIMIZING A ROUTE
        3.1.1. DRAWN BOUNDARIES
        3.1.2. ROUTE GENERATION BASED ON STORED SCHEMA
    3.2. EXAMPLE OPTIMIZED ROUTES
    3.3. EXAMPLE INFORMATION ABOUT A STOP
        3.3.1. STOP DETAILS
        3.3.2. MULTIPLE STOPS DETAILS
    3.4. EXAMPLE ROUTE INFORMATION
    3.5. NAVIGATION INSTRUCTIONS
    3.6. DELIVERY/PICKUP STATUS INFORMATION
        3.6.1. STATUS CHECKBOXES
        3.6.2. PARKING/ENTRANCE/STAIRCASE INFORMATION
    3.7. ROUTE NAVIGATION SUPERIMPOSED ON A MAP
        3.7.1. NAVIGATION SUPERIMPOSED ON A MAP
        3.7.2. APARTMENT INFORMATION SUPERIMPOSED ON A MAP
4. EXAMPLE ROUTE OPTIMIZATION FLOW CHART
    4.1. INITIALIZATION
    4.2. ROUTE OPTIMIZATION
    4.3. ROUTE DETAIL DETERMINATION
5. EXAMPLE ADDRESS GROUPING BASED ON SEMANTIC CONNECTIONS
    5.1. INITIALIZATION
    5.2. ADDRESS GROUPING
    5.3. ROUTE DETAIL DETERMINATION
    5.4. SEMANTIC GROUPING FLOW
6. NOTE ENTERING CAPABILITIES
7. IMPROVEMENTS PROVIDED BY CERTAIN EMBODIMENTS
8. HARDWARE OVERVIEW

1. General Overview

In some embodiments, a computer-implemented method is configured to provide detail instructions for performing point-to-point deliveries. The system is also configured to optimize routes for servicing multiple delivery stops and/or multiple pickup stops and optimize the navigation from between the stops along the routes. To enable route optimization, the system may perform mapping of the delivery destinations, grouping of the destination addresses based on the mapping, and identify parking that is conveniently located to park delivery vehicles, conveniently located staircases, conveniently located elevators, access codes to the secured gates, and the like In some embodiments, a computer-based pickup and delivery system is configured to perform a pickup/delivery route optimization and to dispatch the optimized route information to client applications. The optimization may include optimizing routes for servicing multiple delivery and/or pickup stops. The optimization may also include optimizing route navigation along the routes from one location to another. The optimized navigation may include generating a destination mapping throughout a dense physical structure such as an apartment complex or a business park, and determining convenient locations to park delivery vehicles, conveniently located staircases, conveniently located elevators, access codes to the secured gates, lockboxes, and the like.

The optimized pickup and delivery system may be configured to facilitate pickups and deliveries of various items and goods. For example, the system may facilitate food delivery, goods delivery, parcel and packages pickup and delivery, documents pickup and delivery, medication delivery, and the like. The pickup and delivery system may be integrated with the shipping and/or delivery computerized systems hosted by commercial delivery service providers such as FedEx, DHL, UPS, TNT, and others.

The optimization and mapping functionalities may be based on digitally stored detailed data describing the layouts of the subdivisions, the apartment complexes, and the like. While other systems rely on publicly available maps, such as GPS and satellite maps, the present disclosure relies on detail maps comprising digitally stored map data at a level of detail beyond the level of detail of publicly available conventional GPS data or satellite maps.

Detail maps may be created based on, for example, data collected during individual inspections of the properties and information received from local management, proprietors and residents. Therefore, the detail maps used herein allow grouping location destinations based on adjacency to each other, which may not necessarily correspond to the similarity of the corresponding physical addresses of the destinations. Hence, while some pickup/delivery addresses may be on different streets, the present disclosure allows grouping the addresses into one route because the addresses may be semantically connected even though they are not on the same street. Furthermore, while some pickup/delivery destination addresses may be on the same street, the approach presented herein may allow determining, based on the semantic connections between the addresses, that the most convenient access to the corresponding destinations is from an adjacent street.

Embodiments may include real-time analytics capabilities. These capabilities may include performing real-time analytics of the optimized routes that include multiple pickup or delivery stops. For example, an embodiment may allow determining how to group the stops into the routes so that the groupings are optimized based on multiple constraints, such as an overall delivery time, a length of the route, a traffic constraint, and the like.

A route optimization may include determining a list of pickup or delivery destination scheduled for a particular day. The route optimization may also include determining semantic connections between the addresses included in the list, grouping the addresses based on the semantic connections between the addresses, and determining the routes corresponding to the groupings. The routes may be optimized based on certain constraints, such as a travel time, a travelled distance, both the travel time and the travelled distance, and other constraints. This may result in improving the efficiency in providing the delivery or pickup services. For example, this may include providing services to more destinations than using traditional approaches within the same time period. This may also include reducing a total count of routes and the count of drivers that need to be dispatched to provide the services than the count of drivers that need to be dispatched using other approaches within the same time period. Furthermore, this may include reducing a count of miles driven by the drivers per day.

In some embodiments, a method groups addresses of pickup/delivery destinations to optimize the service routes using semantic connections between the delivery/pickup addresses and locations. Implementing the grouping provides many improvements over other approaches. For example, it allows the vehicle drivers to increase a count of delivery/pickup stops because the routes are optimized and include addresses that are semantically connected. Since the routes are optimized and the addresses are grouped based on the semantic connections between the addresses, the drivers traverse routes that are shorter and that include as many semantically connected locations as possible.

A route optimization may include optimizing various aspects of the pickup/delivery service. This may include optimizing a point-by-point delivery, balancing workloads between routes, reducing the time needed to locate a pickup/deliver destination, such as a particular apartment or suite, reducing the time needed to locate conveniently located parking spots for making the deliveries/pickups, reducing the time needed to locate conveniently located staircases, elevators, and the like. This may also include allowing modifications to the pickup/delivery addresses within routes, making notes about the pickup/delivery destinations, making notes about the routes, and the like. This may also include providing information about security codes necessary to enter secure premises such as apartment complexes, business complexes, and the like.

In some embodiments, a pickup and delivery system is configured to generate and display a user interface for interacting with the system. The user interface may be implemented as a graphical user interface or any other type of interface generated by a client application executing on a user computer device. The user interface may be configured to provide access to a server application executing on a server and implementing a centralized route optimization application. The user interface may receive, from the route optimization application, details about one or more optimized routes, and display the route details on a display of the user computing device. The user interface may also provide interactivity capabilities for providing requests, reviewing and modifying the routes, providing and recording notes and feedback about the destinations along the routes, and providing and recording notes and feedback about the routes and the pickup/delivery services.

2. Route-Optimized Pickup and Delivery System 2.1. Computer Grouping and Optimization System FIG. 1A is a block diagram showing an example computer grouping and optimization system 11 for providing a platform 10 for an address grouping based on semantic connections and for a route optimization. FIG. 1A, and the other figures and all of the description in this disclosure are intended to present, disclose and claim a technical system and technical methods in which specially programmed computers, using a special-purpose distributed computer system design, execute functions that have not been available before to provide a practical application of computing technology to the problem of semantic grouping and optimization model development, validation, and deployment. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1A, computer grouping and optimization system 11, also referred to as a computer system 11, may include one or more memory units 12, one or more processors 14, one or more semantic grouping units 20, one or more storage devices for storing semantic viewpoints 21, a route optimizer 22, one or more storage devices storing drivers' profiles 16, one or more storage devices storing maps 18, one or more communications buses 24, and one or more communications interfaces 26. Computer system 11 may communicate, directly or via one or more communications networks 130, with one or more user devices 140A, 140B, 140C, and 140D.

Computer system 11 shown in FIG. 1A is provided herein to illustrate clear examples and should not be considered as limiting in anyway. Other computer systems may include additional components such as computer servers, various input/output devices, and additional software and/or hardware components that are not depicted in FIG. 1A. Other computer collaboration systems may be implemented in cloud-based systems, distributed computer networks, and the like. Other computer collaboration systems may include fewer components than example computer system 11 shown in FIG. 1A.

Computer system 11 may be configured to facilitate pickups and deliveries of various items and goods. For example, computer system 11 may be configured may facilitate food delivery, goods delivery, parcel and packages pickup and delivery, documents pickup and delivery, medication delivery, and the like. The pickups and deliveries may be arranged as a same-day delivery, a next-day delivery, a third-day delivery, and the like.

Computer system 11 may include one or more storage devices for storing drivers' profiles 16. Drivers' profiles 16 may include information about the drivers' names, drivers' contact information, routes assigned to the drivers, and the like.

Computer system 11 may also include one or more storage devices for storing maps 18. Maps 18 may include geographical maps, satellite maps, detail maps of apartment complexes, detail maps of business parks, detail maps of subdivisions, and the like.

2.1.1. Semantic Grouping Unit

In an embodiment, each of the semantic grouping units 20 and route optimizer 22 comprise one or more sets of stored sequences of program instructions that are configured or programmed to execute the functions that are further described in sections herein corresponding to each functional element. Semantic grouping unit 20 may be configured to determine how to group destination addresses into groups even if the addresses are not on the same street. This may also include determining, based on the maps generated from information collected during the individual inspections of the apartment complexes and/or business parks, the groups of the properties, the convenient access to the properties, and the like. For example, semantic grouping unit 20 may determine that, although some delivery addresses are on different streets, the corresponding properties may be grouped into one route because they are semantically connected with each other. According to another example, semantic grouping unit 20 may determine that, although some delivery addresses are on the same street, the most convenient access to the corresponding properties is from an adjacent street.

Semantic grouping unit 20 may be configured to group addresses into semantically-connected groups for facilitating, for example, point-to-point delivery. To group the destination addresses into semantically connected groups, semantic grouping unit 20 may retrieve data from storage devices storing, for example, semantic viewpoints 21. Semantic viewpoint data refer herein to objects that have certain attributes or properties that may be used to determine whether or how the addresses are semantically connected. Examples of viewpoints may include parking spots, parking garages, elevators, escalators, staircases, floor numbers, lockbox access codes, and the like. The viewpoints may be mapped onto physical locations of the objects such as physical parking spots, parking garages, elevators, and others; all located in the vicinity of the destination addresses. Based on, for example, the proximity between the physical locations of the objects corresponding to the viewpoints and the destination addresses, weights may be assigned to the viewpoints' objects. Once the weights are assigned to the viewpoints, the destination addresses may be grouped based on the assigned weights. Details of the semantic grouping are provided later.

Since fulfilling the pickup/delivery requests timely and efficiently is an important aspect of the delivery service business, semantic grouping unit 20 may collaborate with route optimizer 22 to perform the semantic grouping of the delivery/pickup addresses, map each grouping onto a route, and optimize the routes to ensure that the scheduled delivery/pickup services are provided efficiently and in timely fashion.

2.1.1.1. Semantic Waypoints

Existing navigation systems primarily use the road data and traffic data to determine navigation instructions to locations. Typical navigation instructions may include a plurality of waypoints, mostly expressed as turn-by-turn directions.

One of the limitations of the turn-by-turn directions is that when they are followed in a high density complex and in the last hundred yards or so, the instructions are seldom helpful in reaching the final destination. This is primarily because it is not the roads or turns that a person needs to know to reach the final destination, but other waypoints that are not necessarily expressed as turns. Some of these waypoints may include society gates, entrances, doormen locations, stairways, elevators, parking, backyard, balcony, playgrounds, swimming pools, package rooms and the like. These waypoints are referred to herein as semantic waypoints.

In some embodiments, each of the semantic waypoints has an associated payload, also referred to herein as additional information associated with the waypoint. A payload for a waypoint specifies one or more characteristics specific to the waypoint. For example, some of the waypoints may include payloads that indicate a time window characteristic that indicates different types of handling of the waypoint that depend on the time of day, such as business hours, holidays, etc. Other payloads may indicate the type of activities such as food delivery, delivery of control substance, large package delivery, etc. Other payloads may indicate a type of person that is authorized to perform the delivery, such as a person needs to be certified delivery personnel.

In some embodiments, the payloads have associated modes. For example, a package delivery to a waypoint may be performed by a car, or by a robot, or by a person, or by a drone, etc. The waypoints are navigated not so much in terms of turn-by-turn directions, but in terms such as gate codes, floor numbers, and payment information (for example, in parking).

2.1.1.2. Semantic Grouping

In some embodiments, an approach allows grouping stops that a delivery driver has to make. The approach includes not only the grouping based on physical proximity of the addresses and the street address but also other parameters. In a real-life scenario, many of the high density areas like apartment complexes have neither the same street address across all buildings and/or units, nor necessarily the physical proximity that would qualify the stops to be grouped together.

In some embodiments, an approach uses accurate geospatial data for high density addresses, and the data is linked together through entities that bind them together through a variety of factors based on the type of a job. Determination whether the addresses are tied together may be performed based on a physical proximity, parcel boundaries, locations of leasing offices, locations of mailrooms and/or locations of package lockers. This information may be used to determine whether or not the addresses have a common linking factor outside of the commonly known street address or physical proximity.

Then, a variety of factors may be used to decide how the stops should be grouped or displayed. In some embodiments, the factors include the type of service being performed or the goods being delivered (for example, a 911 call vs. a plumber going for a job vs. a package delivery vs. a food delivery vs. a grocery delivery, etc.

Another factor is a "handoff", which is used to indicate whether a customer needs to meet the entity performing the service ("tasker") outside the building or inside the building. A tasker could be a person or a machine such as a robot or a drone.

Other factor is a current location of the tasker. Additional factors include the availability of a central place to perform the service (for example, existence of a leasing office or a mailroom or a package room for deliveries). The availability of a central place is further contingent on the type of service, hour of day, and day of week. The availability also includes the availability of elevators and staircases, which helps determine the kind of equipment or the quantity of goods that the tasker can carry, and therefore helps determining whether or not the tasker can perform multiple stops.

2.1.2. Route Optimizer

Route optimizer 22 may also be configured to perform a destination mapping. The mapping may be performed based on the in-depth knowledge of the property layouts and details. In some embodiments, route optimizer 22 relies on detail maps of the properties. The detail maps may be based on information provided by the properties' proprietors, information collected during individual inspections of the properties, and information provided by the properties' management and residents.

Route optimizer 22 may be configured to optimize routes for servicing multiple delivery stops and/or multiple pickup stops and to optimize the navigation directions from one stop to anther along the routes. Route optimizer 22 may determine the navigation directions for a point-to-point delivery, based on maps stored in storage devices 18 and information about semantic viewpoints stored in storage devices 21.

To enable the route optimization, route optimizer 22 may perform a multiple destination mapping throughout a route and identify convenient locations to park delivery vehicles, conveniently located staircases, conveniently located elevators, and the like. The route optimization may also include providing access codes for lockboxes and access codes for entrances to the secured gates, and the like.

Route optimizer 22 may also provide real-time analytics functionalities. The functionalities may include performing real-time analytics of the route optimization for multiple pickup stops and/or delivery stops. This may include determining the routes that are optimized based on multiple constraints. The constraints may include a time constraint, a distance constraint, a traffic constraint, and the like.

2.1.3. Interfaces

Computer system 11 may be configured to interact with one or more components described above, as well as with user devices 140A-140D operated by, for example, drivers who provide delivery/pickup services to customers. To facilitate the interactions, computer system 11 may use one or more communications buses 24 and one or more communications interfaces 26. Communications buses 24 may be implemented using any type of computer-based technology, and so may communications interfaces 26.

Communications interface 26 may be configured to facilitate communications between components of computer system 11 and user devices 140A-140D. In some embodiments, computer system 11 may be configured to interact directly with users of user devices 140A-140D. In other embodiments, computer system 11 may be configured to interact with users of user devices 140A-140D via computer network 130, as shown in FIG. 1A.

Computer network 130 may be implemented as any type of communications network, including a local area network (LAN), wide area network (WAN), a wireless network, a secure virtual LAN (vLAN), a secure virtual WAN (vWAN), and the like.

2.1.4. User Devices

User devices 140A-140D may include mobile and stationary devices that users of a route-optimized pickup and delivery system may use to provide services to customers. Some of the users may be managers of the route-optimized pickup and delivery system and may use devices 140A-140D to configure and manage computer system 11, to dispatch the route information to drivers responsible for providing the pickup/delivery services, and to monitor and manage the drivers and the service operations. Some of the users may be the drivers who may use devices 140A-140D to contact the managers, request instructions from the managers, download the route information to devices 140A-140D, use the downloaded information to provide the delivery/pickup services to customers, and provide feedback about the pickups and deliveries.

User devices 140A-140D may include any type of communications devices configured to facilitate communications between users of user devices 140A-140D and computer system 11. In the example depicted in FIG. 1A, a user device 140A is a laptop, a user device 140B is a personal computer, a user device 140C is a personal assistant device, and a user device 140D is a mobile device such as a smartphone. The types and counts of user devices 140A-140D are not limited to the examples shown in FIG. 1A. For example, even though FIG. 1A depicts only one laptop 140A, one personal computer 140B, one personal assistant 140C and one smartphone 140D, platform 10 may include a plurality of laptops 140A, a plurality of personal computers 140B, a plurality of personal assistants 140C and/or a plurality of smartphones 140D. In other examples, user devices may include fewer or different devices than those depicted in FIG. 1A.

2.2. Example Graphical User Interfaces

In some embodiments, a pickup and delivery system is configured to generate and display a user interface that is configured to facilitate interactions with the system. The user interface may be generated by executing a client application residing on, for example, a portable computing device and communicating with a server application executing on a server or in a cloud. Access to the client applications may be secured and only the users who have been granted access credentials may access the client applications.

The user interface may be implemented as a graphical user interface or any other type of interface. It may be displayed on displays of any type of computing device, including smartphones, tablets, personal assistants, laptops, personal computers, servers, and the like. The user interface may be configured to provide access to a server application executing on a server and implementing, for example, a centralized route optimization application. The user interface may receive, from the route optimization application, details about the optimized routes. The user interface may also display the details on a display of the computing device.

The user interface may also provide interactivity capabilities. For example, the user interface may provide interactive elements configured to request and receive data, display the data on the user interface, request and obtain route details from a server application executing on a server, display the obtained route details in the user interface, and the like.

The user interface may also be configured with interactive elements that allow reviewing and modifying the routes, providing and recording notes and feedback about the destinations along the routes, and providing and recording notes and feedback about the routes and pickup/delivery services.

Figure 1B:
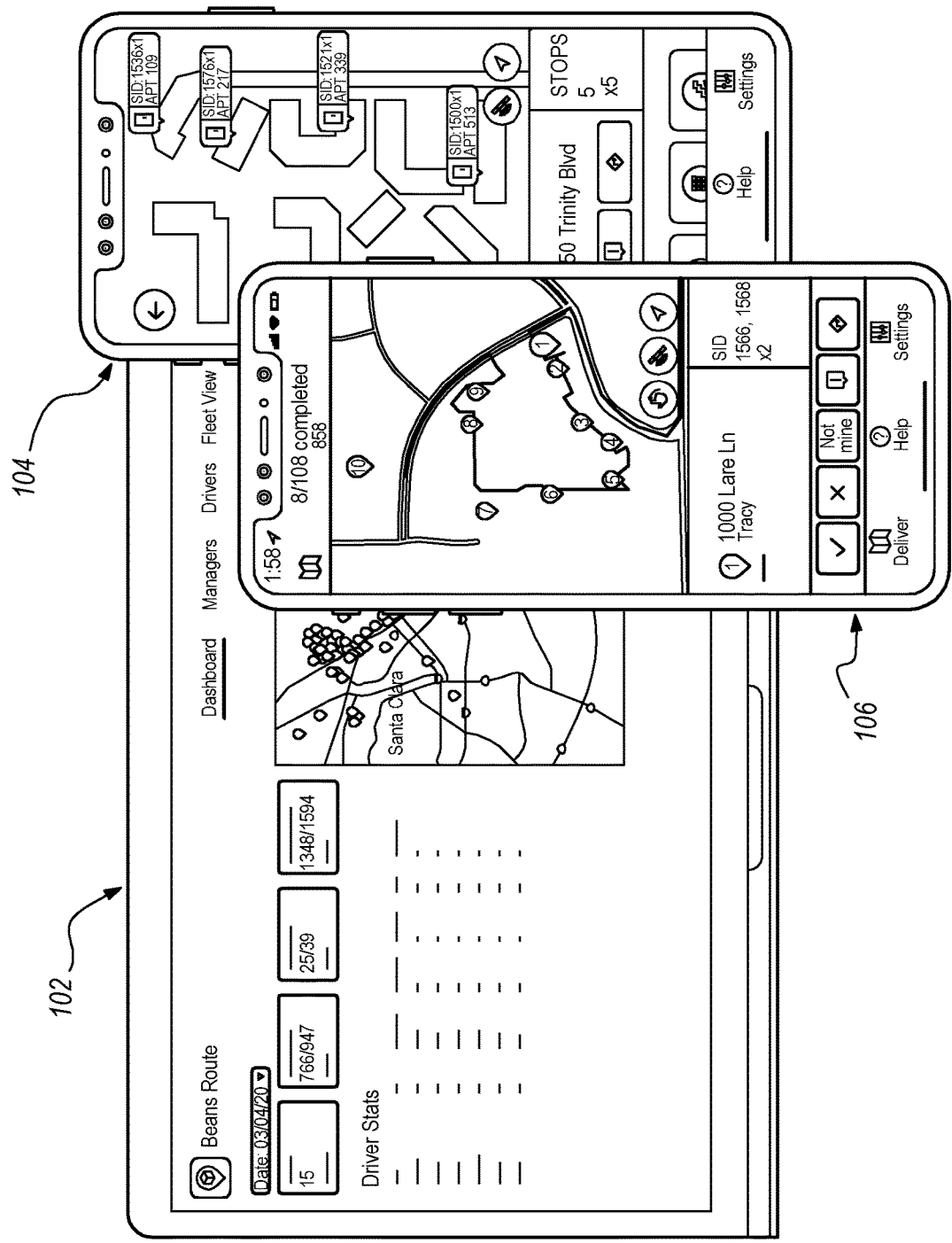
FIG. 1B shows example graphical user interfaces generated by pickup and delivery system applications configured to optimize pickup/delivery routes.

FIG. 1B shows example graphical user interfaces generated by pickup and delivery system applications configured to optimize pickup/delivery routes. The graphical user interfaces may be configured to generate a variety of displays, and the displays may be designed to present different types of information and/or in different formats. The graphical user interfaces may be displayed on any type of computing devices, including smartphones, tables, personal assistants, laptops, personal computers, workstations, and the like.

The depicted example shows three displays 102, 104 and 106, each of which may be driven by different computer systems. Display 102 may be generated and displayed by a personal computer, display 104 may be generated and displayed by a portable device such as a smartphone, and display 106 may be generated and displayed by another portable device such as a tablet.

2.2.1. Example Dashboards

In FIG. 1B, display 102 may correspond to a dashboard display. Dashboard display 102 may include several tabs, such as a dashboard tab, a manager's tab, a driver's tab, a fleet view tab, and others. Each of the tabs may allow navigating through different displays. For example, the dashboard tab may show several routes that have been scheduled for a particular day, the manager's tab may show the names and contact information of the managers who are responsible for managing or overseeing the service operations, the driver's tab may show the names and contact information of the drivers who provide the pickup/deliver services, and the fleet view tab may show information about the vehicles used by the drivers.

Dashboard display 102 may be available to managers, dispatchers or other individuals who may be responsible for managing or overseeing the pickup/delivery service operations. For each route, dashboard display 102 may provide a count of stops, a name of the pickup/delivery driver, and other route related information. The dashboard display may also show a map indicating a geographical location for the route and locations of the individual stops. The stops may be shown on the map using color-coded indicators and stops belonging to the same route may be color-coded using the same color.

Figure 2:
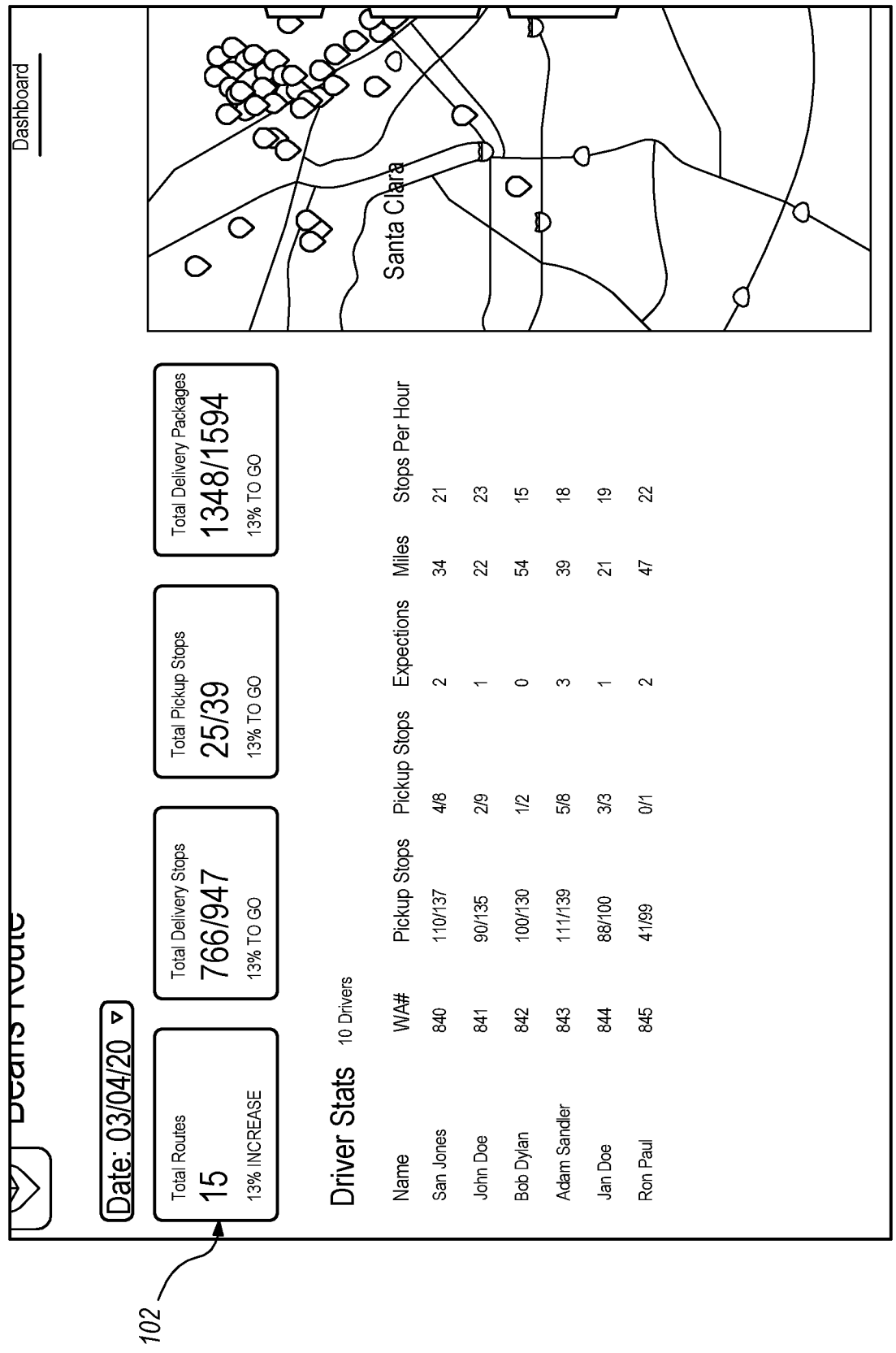
FIG. 2 shows an example dashboard.

FIG. 2 shows an example dashboard. An example dashboard 102 may have several interactive tabs, including a total route count tab, a total delivery stop count, a total pickup stop count, a total delivery package count and a total pickup package count. Additional interactive tabs may also be implemented.

Dashboard 102 may also include a "Driver Stats" panel comprising information about the drivers providing the pickup/delivery services. The information may be displayed in many different formats. One of them is a table that includes statistical information about the drivers. The table may include the names of the drivers and for each driver, an identifier, a count of delivery stops, a count of pickup stops, a count of exceptions, a count of miles travelled, and a count of stops per hour. In an embodiment, the tabs and Driver Stats panel may be displayed near or adjacent to a digital map.

2.2.2. Example Maps

Referring again to FIG. 1B, display 104 may show a map depicting geographical locations of pickup/delivery stops included in a route. Display 104 may also show detail information about the route. Display 104 may be generated and displayed on any of user devices 140A-140D. For example, display 104 may be displayed on devices of drivers who have been assigned handling pickups/deliveries along the routes. The map may be any type of map, including a satellite map, or any other type of map. Additional examples of display 104 and the routes are provided later.

2.2.3. Example Route Detail Views

Display 106 may show a detail view of a route and the stops along the route. Display 106 may be generated and displayed, for example, on a mobile device used by a driver who has been assigned handling the pickups/deliveries along the route. Display 106 may show, for example, the stops that the driver has already visited and the order which the driver needs to follow to complete the route. The stops may be numbered and shown as aligned along the route path.

Display 106 may also show individual addresses of the stops and interactive elements that can be used to provide and retrieve information. For example, for a particular stop, display 106 may display an address of the stop, a name of the customer who requested a delivery/pickup, and additional information about the stop.

Examples of interactive elements shown in FIG. 1B are provided herein to illustrate simple examples, not to provide a complete list of such elements. Display 106 may include, for example, an interactive element that a driver may select to indicate that the pickup/delivery at a stop has been completed. Display 106 may also include an interactive element that a driver may select to indicate that a pickup/delivery at a stop cannot be completed for some reason.

Display 106 may also include an interactive element that the driver may select to indicate that the stop does not belong to the route assigned to the driver. Furthermore, display 106 may include an interactive element that the driver may select to request additional information such as location information about a nearest parking structure, location information about a nearest staircase, and/or an access code to a building or a lockbox. Display 106 may also include an interactive element that the driver may select to request directions to a stop and/or additional instructions for picking/delivering items from/to the stop. Additional examples of display 106 and the routes are provided later.

2.3. Settings, Personalization and Support

Figure 3:
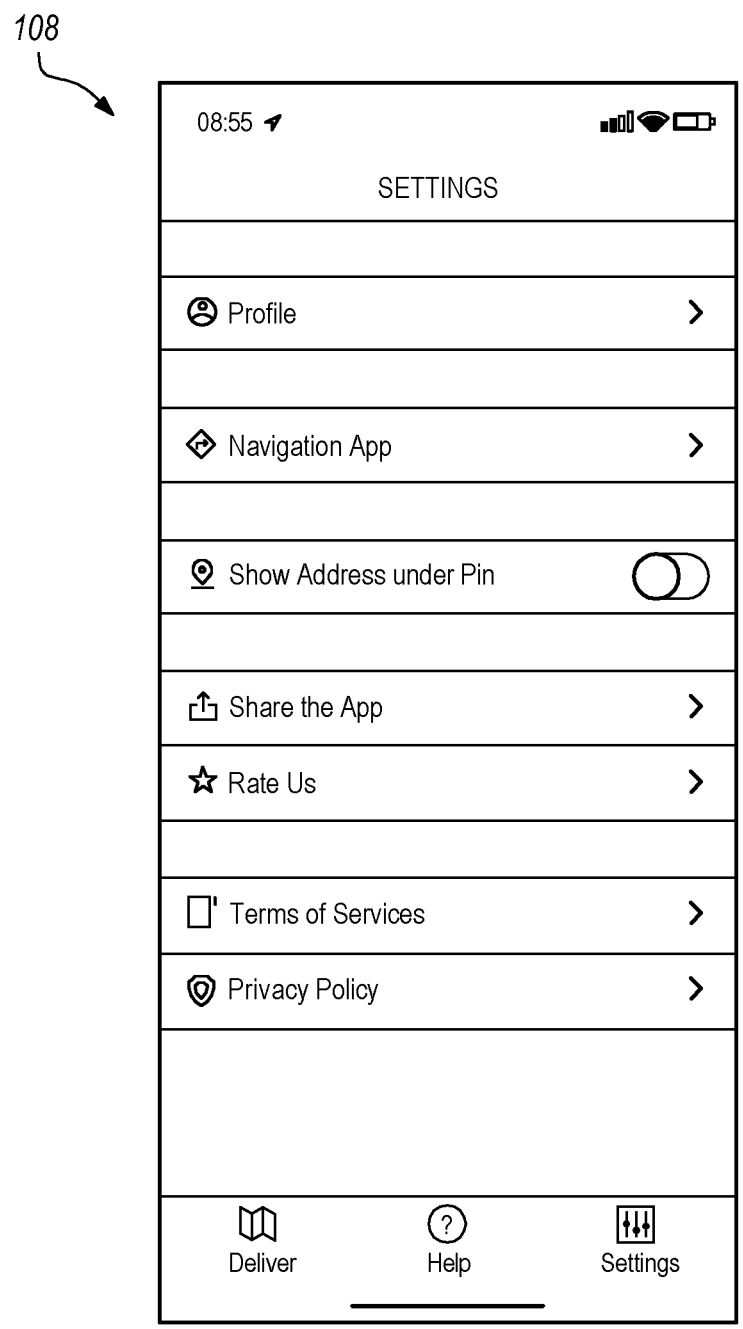
FIG. 3 is an example graphical user interface configured to provide setting and personalization functionalities in an example pickup and delivery system.

FIG. 3 is an example graphical user interface 108 configured to provide setting and personalization functionalities in an example pickup and delivery system. The customization examples depicted in FIG. 3 are provided to illustrate simple examples and not to limit the customization options in any way.

2.3.1. Profile Settings

The customization examples depicted in FIG. 3 include creating a user profile, selecting a navigation application to be used to in following pickup/delivery routes, showing addresses that are protected by a pin (i.e., a security code), and sharing the application with other users or devices. Additional customization settings may include an interactive element to rate the pickup/delivery application and/or to rate the functionalities provided by the application. The settings may also include other interactive elements not shown in FIG. 3.

Figure 4:
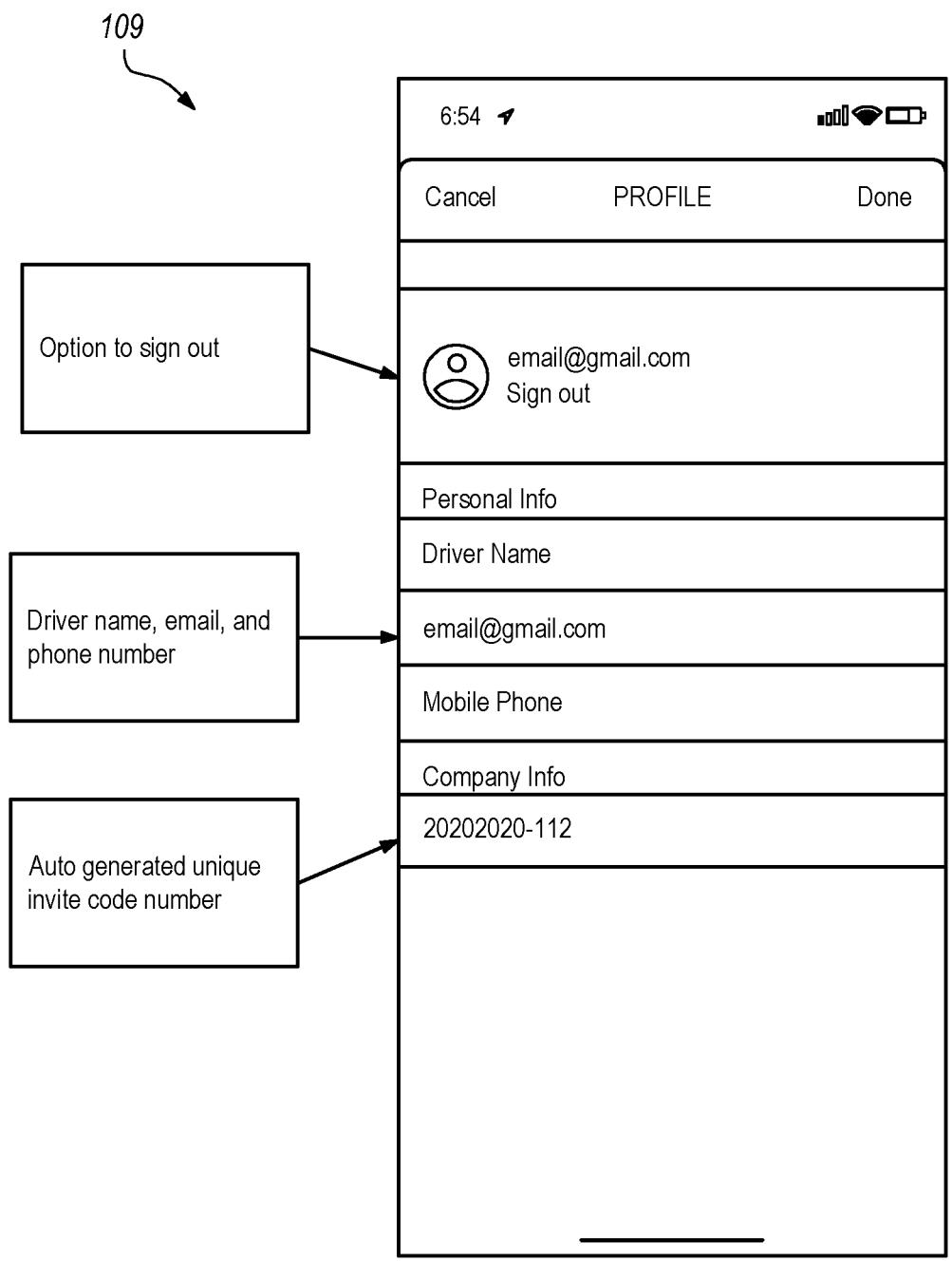
FIG. 4 is an example graphical user interface configured to provide profile setting functionalities in an example pickup and delivery system.

FIG. 4 is an example graphical user interface 109 configured to provide profile setting functionalities in an example pickup and delivery system. The profile settings may include setting a driver's email address, a driver's name, a driver's phone number, an auto generated unique invite code number, and the like. Other profile settings may also be implemented.

2.3.2. Navigation Settings

Figure 5:
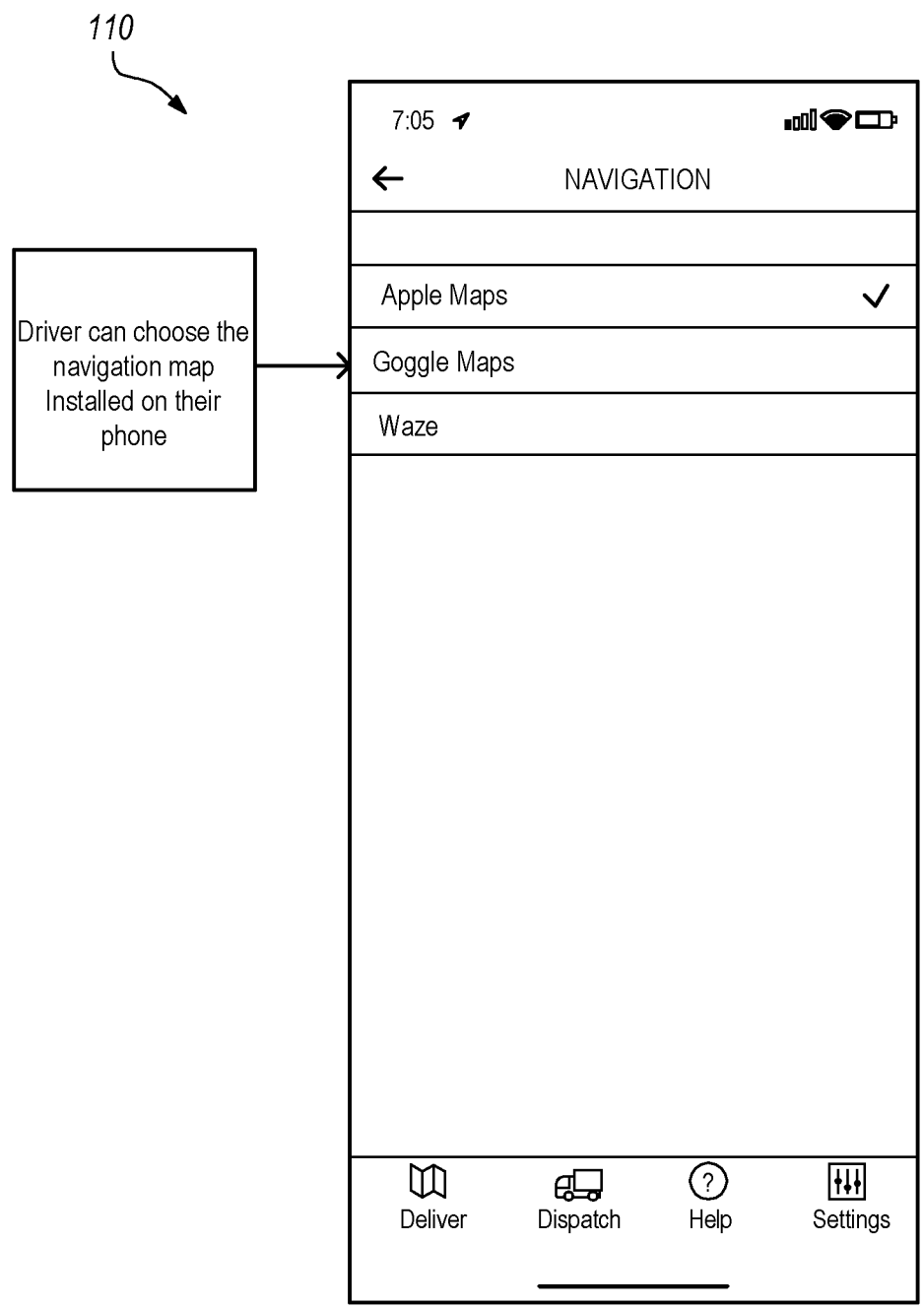
FIG. 5 is an example graphical user interface configured to provide profile setting functionalities in an example pickup and delivery system.

FIG. 5 is an example graphical user interface 110 configured to provide navigation setting functionalities in an example pickup and delivery system. The navigation settings may allow a driver to choose the navigation application that the driver wants to install on his/her portable device and use to navigate along an optimized route. In the depicted example, the choices include the Apple maps, the Google maps, and the Waze maps. Other choices may also be available.

2.3.3. Support Settings

Figure 6:
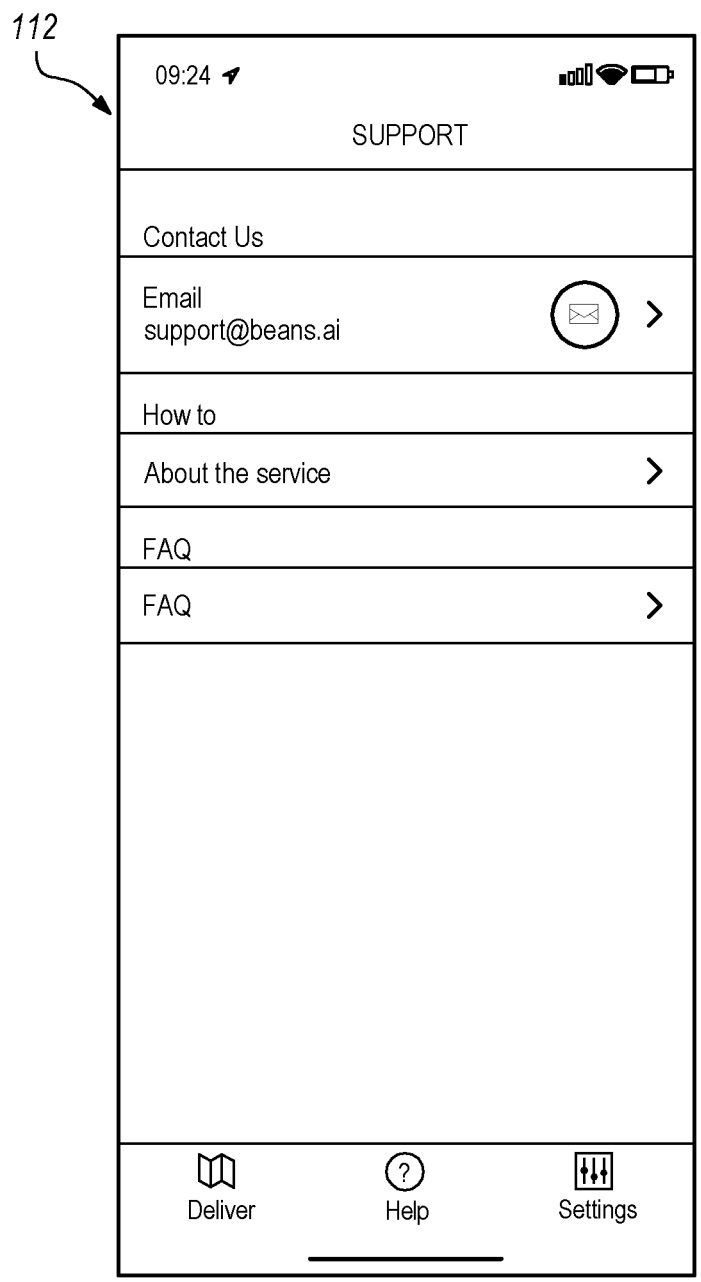
FIG. 6 is an example graphical user interface configured to provide support functionalities in an example pickup and delivery system.

FIG. 6 is an example graphical user interface 112 configured to provide support functionalities in an example pickup and delivery system. The functionalities depicted in FIG. 6 are provided to illustrate simple examples and not to limit the functionalities in any way.

Example support functionalities depicted in FIG. 6 include an interactive button configured to provide an interface to compose an email and send the email to a support team. The support functionalities may also include an interactive element to request and obtain information about the service. The information may be organized by categories, types or topics. The implementations may depend on the specific characteristics that the pickup and delivery application is configured and customized to provide.

Support information may include an interactive element configured to facilitate drafting and sending an email to the support team. The support information may also include an interactive element configured to use a hyperlink to access a website or a webpage containing information about the delivery/pickup service. The support information may further include an interactive element configured to use a hyperlink to access a website or a webpage containing frequently asked questions (FAQ) and answers to the questions. Other support functionalities may also be provided.

2.4. Example Maps

Figure 7:
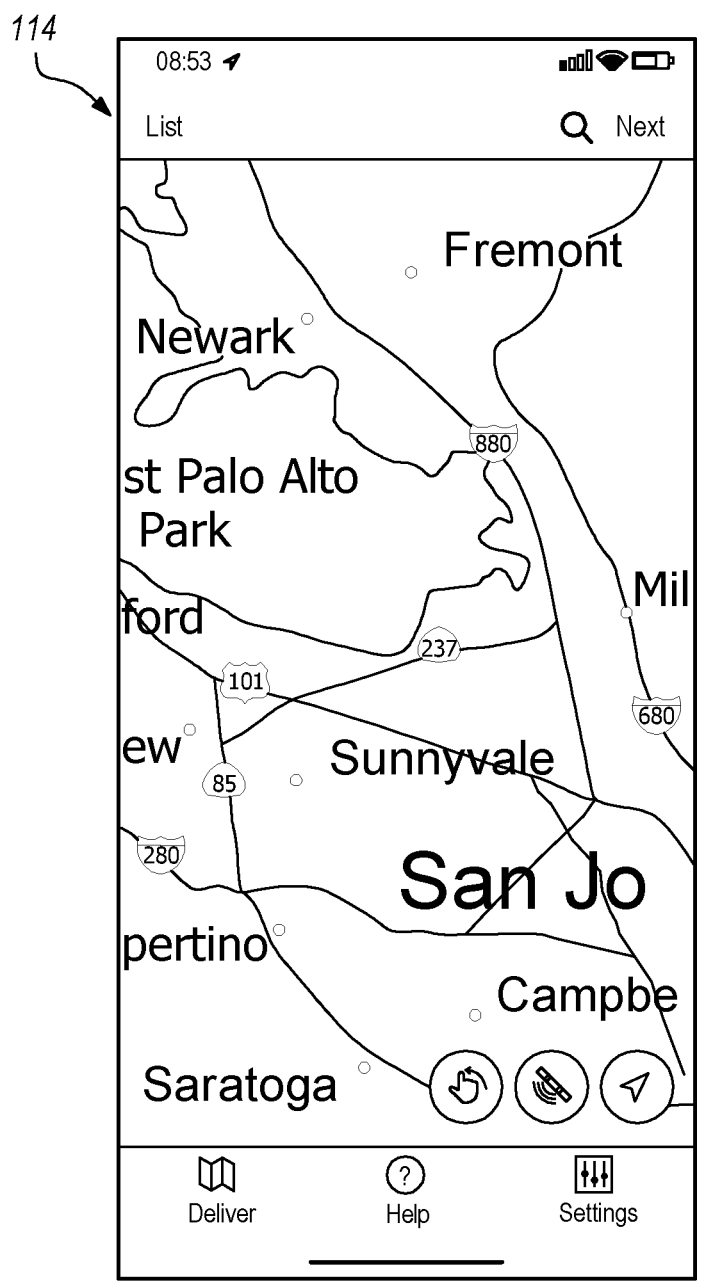
FIG. 7 is an example graphical user interface configured to provide maps in an example pickup and delivery system.

An example pickup and delivery system application configured to optimize pickup/delivery routes may provide various types of maps. FIG. 7 is an example graphical user interface 114 configured to provide maps in an example pickup and delivery system. The example map depicted in FIG. 7 is provided to illustrate a simple example and not to limit the map options in any way.

2.4.1. Geographical Maps

A map example depicted in FIG. 7 is a geographical map showing names of cities and towns, locations of the cities/towns, major roads and highways and greenery areas. Other maps may include addition details.

The display depicted in FIG. 7 also includes interactive elements that allow interactions with the application. The interactive elements may include an interactive element to request and obtain delivery orders, an interactive element to request and obtain helpful information for using the application and/or using the service, an interactive element for entering and/or modifying setting inputs.

Figure 8:
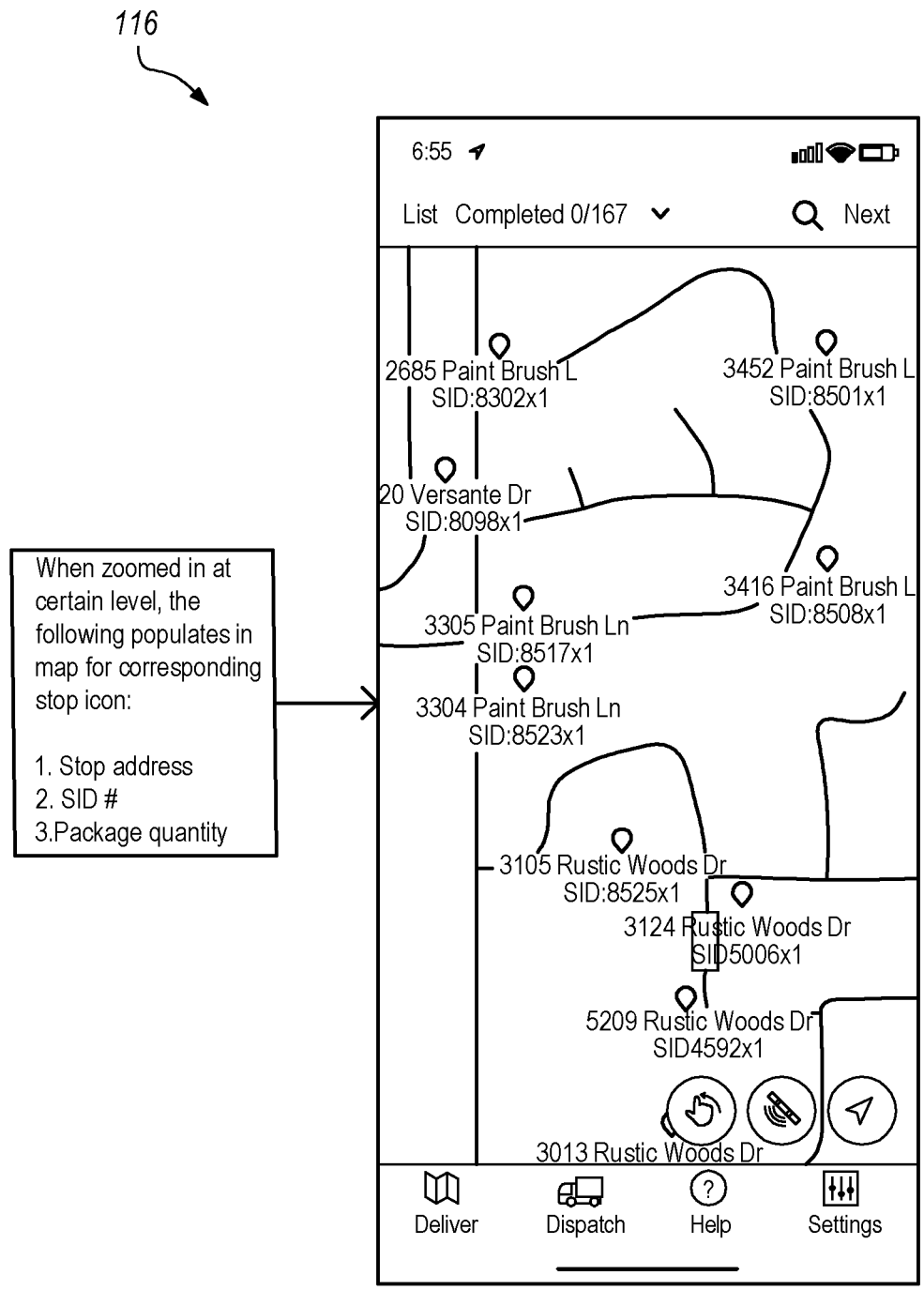
FIG. 8 is an example graphical user interface configured to provide detail maps in an example pickup and delivery system.

FIG. 8 is an example graphical user interface 116 configured to provide detail maps in an example pickup and delivery system. The depicted example is provided to illustrate that, if a user interacts with interactive elements to zoom in on a particular area depicted in a map, such as the map in FIG. 7, then the graphical user interface of FIG. 8 may generate and display a more detail map. The detail map may be obtained by populating information about stops included in a route, populating information about service identifiers assigned to the pickups/deliveries, and/or populating information about the quantity of the packages to be delivered at the stops.

2.4.2. Satellite Maps

Figure 9:
FIG. 9 is an example graphical user interface configured to provide a map for a route optimization.

FIG. 9 is an example graphical user interface 118 configured to provide maps in an example pickup and delivery system. An example map depicted in FIG. 9 is a satellite map that depicts buildings, roads, greenery, and other structural objects captured by one or more satellites in the satellite imagery. Other maps may include addition details.

The example map depicted in FIG. 9 may also include interactive elements that allow interactions with the application. The interactive elements may include the same interactive elements described in FIG. 7, or additional elements not shown in FIG. 7.

2.5. Point-to-Point Delivery

Figure 20:
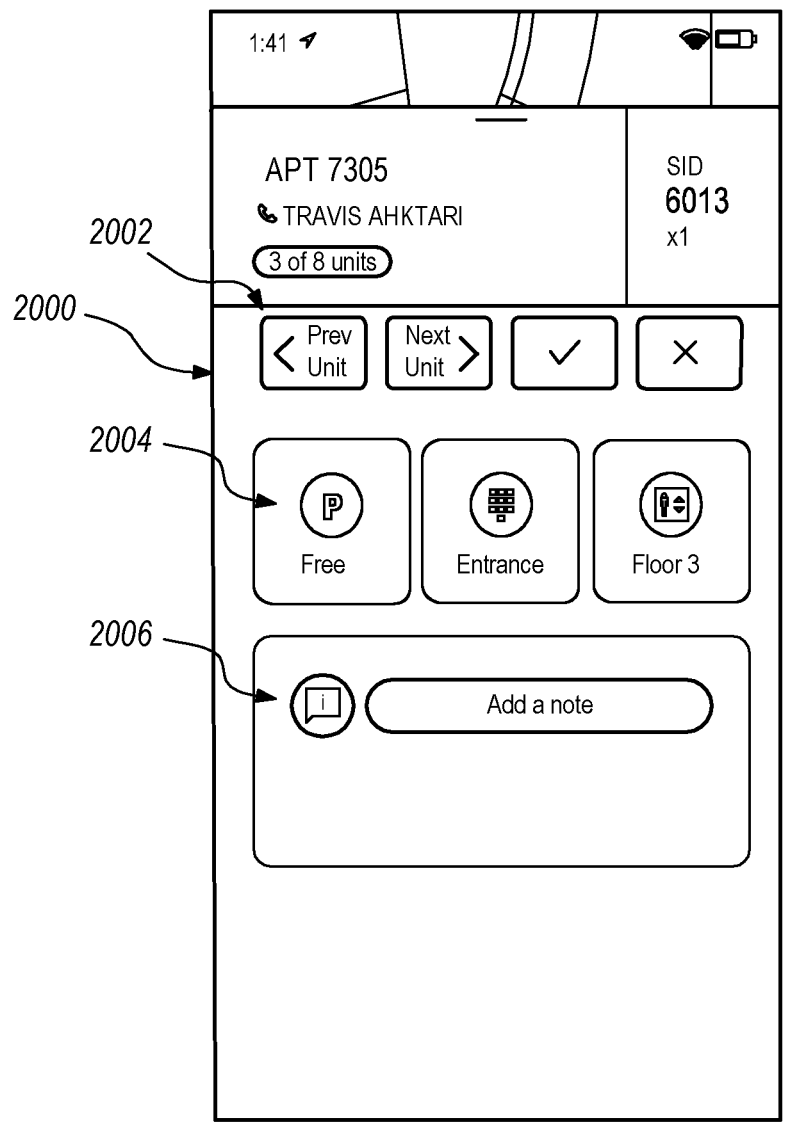
FIG. 20 is an example graphical user interface configured to display route navigation information.

FIG. 20 is an example graphical user interface configured to display route navigation information. A depicted display 702 provides a graphical user interface for obtaining and receiving instructions and helpful information that a driver may use to perform a point-to-point delivery. In the depicted example, a driver is attempting to deliver a package to an apartment 7305. Display 702 shows the apartment number, a name of a customer who placed an order for a delivery or pickup at the apartment, a service identifier (SID), an order identifier, a count of packages to be delivered to the apartment 7305 and several navigation elements. The navigation elements include an interactive element to navigate to a previous stop (i.e., a previous point of delivery) and an interactive element to navigate to a next stop (i.e., a next point of delivery). The navigation elements may also include checkboxes to indicate whether delivery has been completed. Display 702 also shows a complete-delivery checkbox and an incomplete-delivery checkbox that may be used to indicate whether a delivery, or a pickup, to the apartment 7305 was successful or not.

Display 702 may also include interactive elements configured to provide additional information for performing delivery to the apartment 7305. When selected by a driver, the interactive elements allow requesting the specific delivery information. The interactive elements may include a parking-interactive element, an entrance-access-code-interactive element, a staircase and floor interactive element, and the like. Hence, if the parking-interactive element is selected, then display 702 is updated and information about a nearest parking is provided. If the entrance-access-code-interactive element is selected, then display 702 is updated and information about an access code to enter a secured gate leading to the apartment 702 is provided. If the staircase-interactive element is selected, then display 702 is updated and directions to the nearest staircase leading to the apartment 7305 is displayed.

Furthermore, the navigation elements may include an interactive element for adding a note related to a stop of a point-to-point delivery. The note may be provided by a driver who attempts to make a delivery at the stop address, instructions for making the delivery at the address, reporting message from the driver to the system coordinator or a manager, and the like.

3. Route Grouping and Optimization

In some embodiments, a pickup and delivery system groups the addresses of pickup and/or delivery destinations to optimize the service routes. The route optimization may be performed using various criteria, including, for example, semantic connections between the delivery/pickup addresses and locations. Implementing the grouping provides many improvements over the known approaches. For example, it allows the service drivers to increase a count of delivery/pickup stops because the routes are optimized and include addresses that have semantic connections between them. Since the routes are optimized and the addresses are grouped based on the semantic connections between the addresses, the drivers traverse, for example, the routes that are as short as possible and that include as many semantically connected locations as possible.

A route optimization may include determining a list of pickup/delivery stops, determining semantic connections between the addresses of the stops, grouping the addresses based on the semantic connections between the addresses, and determining the routes that are optimized based on certain constraints. Examples of the constraints may include a travel time, a travelled distance, both the travel time and the travelled distance, and others. The route optimization may result in increasing a count of destinations serviced within an hour, reducing a total count of routes being dispatched and/or reducing a count of miles driven per day.

A route optimization may include optimizing various aspect of the delivery/pickup service. This may include optimizing a stop-by-stop service, balancing workloads between the routes, reducing the time needed to locate a delivery/pickup destination (such as a particular apartment or suite), reducing the time needed to locate convenient parking spots for making a delivery/pickup, reducing the time needed to locate convenient staircases, elevators, and the like. This may also include allowing to modify delivery/pickup addresses within the routes, making notes and attaching the notes to the delivery/pickup destinations, making notes and attaching the notes to the routes, and the like. This may also include providing information about security codes necessary to enter secured premises such as apartment complexes, business complexes, and the like.

In an embodiment, a method comprises receiving data identifying a plurality of destinations; determining, based on information relating to the plurality of destinations, that a first destination of the plurality of destinations and a second destination of the plurality of destinations should be grouped and, in response, generating data defining a multiple-stop destination comprising the first destination, the second destination, and a first semantic waypoint; causing display, on a graphical user interface of a client computing device, of a map comprising an identifier of a third destination of the plurality of destinations and an identifier of the multiple-stop destination; and receiving, through the graphical user interface, a selection of the multiple-stop destination and, in response, causing display on the map of an identifier of the first destination, the second destination, and the first semantic waypoint.

3.1. Optimizing a Route
3.1.1. Drawn Boundaries

Figure 10:
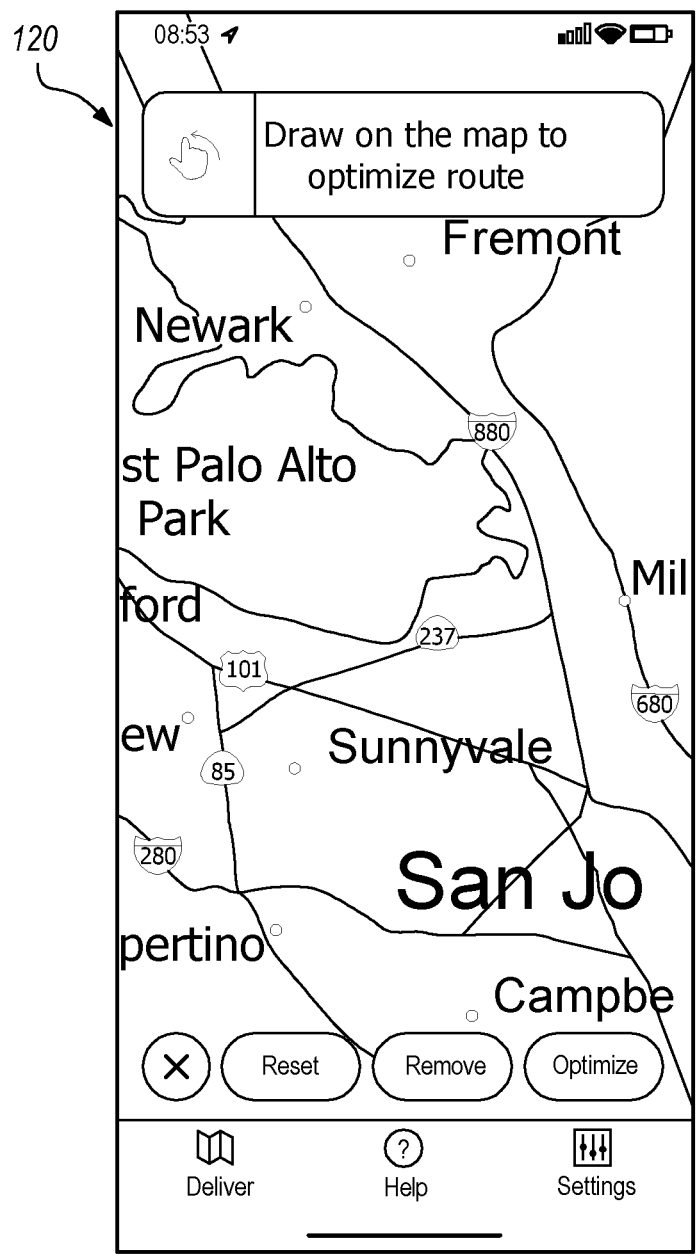
FIG. 10 is an example graphical user interface for providing input to a route optimization.

FIG. 10 is an example graphical user interface 120 for providing input to a route optimization. To start a route optimization, example graphical user interface 120 may provide interactive elements that may be configured to, for example, draw on the map the boundaries of a region in which a route should be optimized. Drawing the boundaries on the map may allow indicating the region or a portion of the region for which the route needs to be optimized. The example drawing process is shown in FIG. 11.

Figure 11:
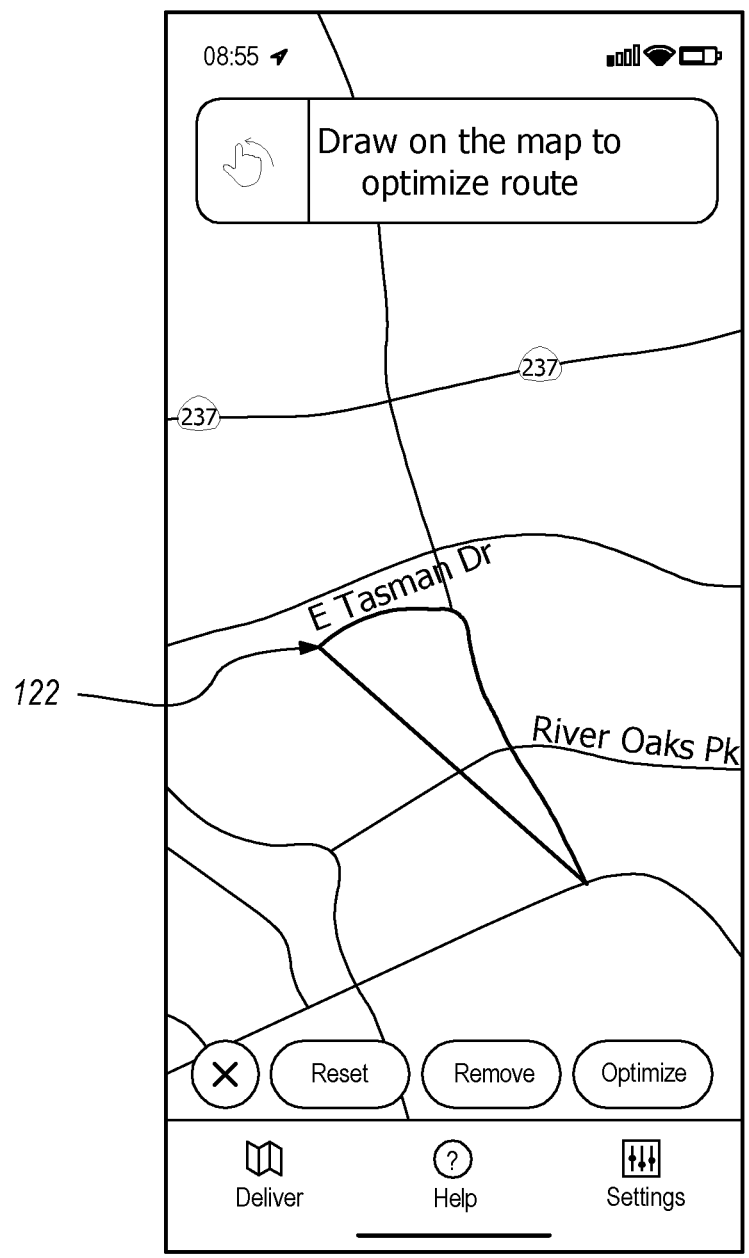
FIG. 11 is an example graphical user interface for drawing boundaries of a region on a map.

FIG. 11 is an example graphical user interface for drawing boundaries of a region on a map for a route optimization. To indicate a region on a map, a user may free-hand draw a boundary 122 of the region on the map. The boundaries may be defined as the user presses, for example, a button of a computer mouse and, having the mouse button pressed, moves the mouse along the map to form an enclosed region. Once the boundaries are formed, the user interface interprets the locations of the boundaries on the map, translates the boundaries to physical geographical coordinate values, and uses the geographical coordinates to identify the delivery/pickup stops that have been scheduled. Then, an optimized route including the identified stops is generated.

The example graphical user interface may further include several interactive elements that are configured to optimize a delivery/pickup route. In the example depicted in FIG. 11, the interactive elements include a cancel-element that allows cancelling a drawing of the boundaries for a selected region and/or canceling an optimization of the route for the selected region. The interactive elements may also include a reset-element that is configured to reset the selection of the region and to reset the route optimization. The interactive elements may also include a remove-element for removing a selected region, removing a stop, and the like. The interactive elements may also include an optimize-element that is configured to request an optimization of a route for the selected region. Other interactive elements and additional functionalities may also be implemented.

3.1.2. Route Generation Based on Stored Schema

In an embodiment, the pickup and delivery system stores a data schema which includes information for a plurality of destinations. The data schema may identify, for each destination of the plurality of destinations, a location of the destination and one or more semantic waypoints for the destination. The destinations may include discrete locations, such as houses or business, and/or destinations within a location, such as different apartment units in an apartment building.

The semantic waypoints may include one or more parking locations, building entrances, unit location, stair or elevator locations, and/or drop-off locations. A single destination may include semantic waypoints for a plurality of parking locations, building entrances, and/or stair or elevator locations. The data identifying the drop-off locations may comprise location information for the drop-off locations, semantic waypoints for the drop-off locations, such as building entrances and/or parking locations, and/or limiting data for the drop-off locations. The limiting data may comprise data identifying times of day when the drop-off location is accepting packages or not accepting packages, days of the week and/or year when the drop-off location is accepting packages or not accepting packages, and/or types of packages that can be accepted or cannot be accepted at the drop-off locations. For example, if the drop-off location is a mail room, the limiting information may indicate that food and beverage deliveries cannot be dropped off at the drop-off location.

Figure 15:
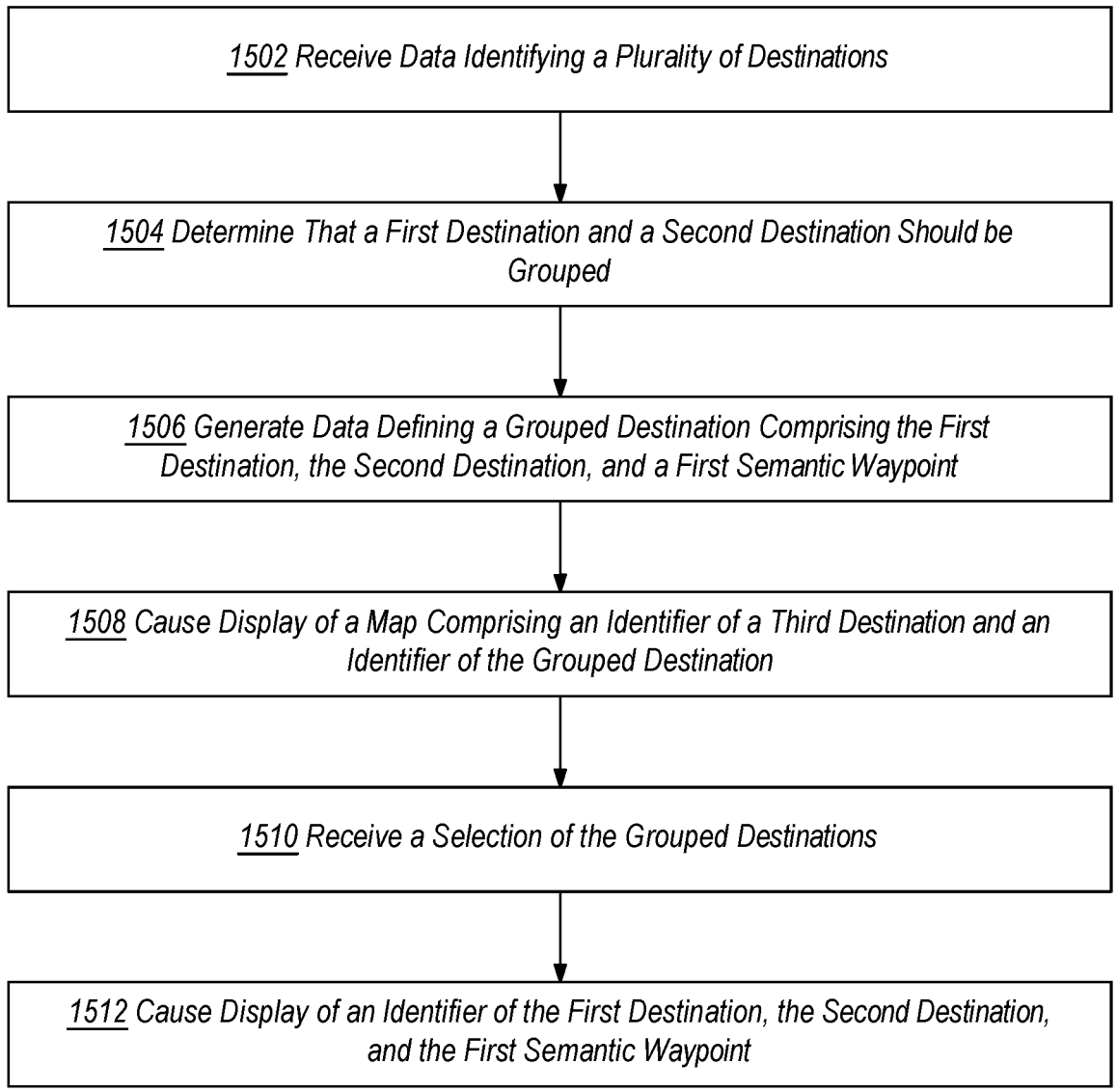
FIG. 15 depicts an example method of optimizing a delivery route through grouping of destinations.

The data schema may be used to identify locations on a delivery route to optimize through grouping. FIG. 15 depicts an example method of optimizing a delivery route through grouping of destinations.

At step 1502, data identifying a plurality of destinations is received. For example, the pickup and delivery system may receive data defining a delivery route for a particular driver. The delivery route may comprise a list of delivery destinations and one or more items to be delivered to each of the delivery destinations. The delivery route may be uploaded to the pickup and delivery system from an external source and/or created through selection of a plurality of destinations through a graphical user interface provided by the pickup and delivery system.

At step 1504, the pickup and delivery system determines that a first destination and a second destination of the plurality of destinations should be grouped. In an embodiment, the pickup and delivery system groups destinations based on physical location. For example, the pickup and delivery system may group destinations such that all multiple-stop destinations are within a threshold distance, such as 100 meters, of each other. Additionally, or alternatively, the pickup and delivery system may group destinations based on distances from the destinations and a central location, such as an available parking location.

In an embodiment, the pickup and delivery system groups destinations that are associated with a same semantic waypoint. For example, the pickup and delivery system may identify, in the data schema, a particular semantic waypoint, such as a parking location, that is shared amongst a plurality of destinations. The pickup and delivery system may determine that the plurality of locations should be grouped based on the semantic waypoint being shared amongst the plurality of destinations. The pickup and delivery system may be configured to optimize groupings to reduce a number of total destinations. For example, if six destinations could be grouped, based on shared semantic waypoints, as two groups of three or one group of four and two groups of one, the pickup and delivery system may be configured to generate the groupings as the two groups of three to minimize the number of total destinations.

In an embodiment, the pickup and delivery system additionally applies a particular delivery criterion based on the limiting data for the semantic waypoints to determine if the semantic waypoints may be used to group destinations. The particular delivery criterion may For example, two destinations may share a drop-off location and would thus usually be grouped based on the drop-off location. The pickup and delivery system may apply the limiting data to determine if the drop-off location would be a valid semantic waypoint for the delivery. For example, the pickup and delivery system may determine that the delivery is occurring on a time or day when the drop-off location is not accepting deliveries or that an item being delivered to one or more of the locations is not a type of item that can be delivered to the drop-off location, such as prepared food or beverages. In response to determining that the semantic waypoint is not valid for the delivery, the pickup and delivery system may remove the shared semantic waypoint as a basis for grouping the destinations. The destinations may still be grouped based on other semantic waypoints and/or distance, but the drop-off location may no longer be a basis for the grouping.

The limiting information may additionally be used to determine whether a semantic waypoint should be displayed for a plurality of destinations. For example, if two grouped locations share a drop-off location, the pickup and delivery system may determine if the particular delivery criterion relating to the limiting data is satisfied and only display the semantic waypoint for the plurality of destinations if the particular criterion is satisfied. Thus, a drop-off location may not be displayed if the delivery is on a time or day when the drop-off location is not accepting deliveries or if the delivery is of a type that cannot be delivered to the drop-off location.

At step 1506, the pickup and delivery system generates data defining a multiple-stop destination comprising the first destination, the second destination, and a semantic waypoint. For example, the pickup and delivery system may store data identifying the grouped location as including the first destination, the second destination, and at least the semantic waypoint. The multiple-stop destination may additionally include additional destinations and/or semantic waypoints.

Figure 16A:
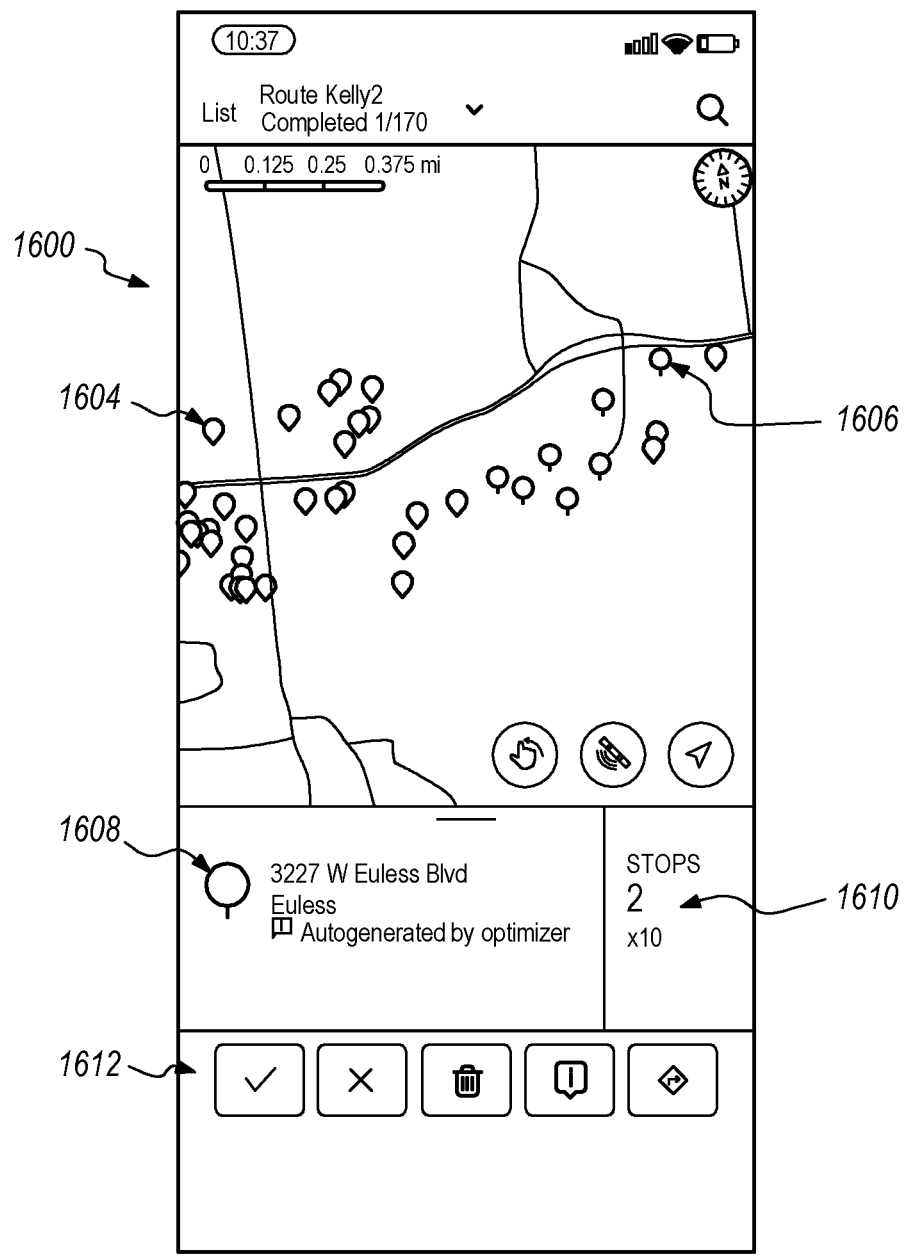
FIG. 16A depicts an example map comprising identifiers of individual destinations and identifiers of multiple-stop destinations.

At step 1508, the pickup and delivery system causes display of a map comprising an identifier of a third destination and an identifier of the multiple-stop destination. The map may visually distinguish between individual destinations and multiple-stop destinations, such as through different icons, different colored icons, differently sized icons, or other visual distinctions. FIG. 16A depicts an example map comprising identifiers of individual destinations and identifiers of multiple-stop destinations. Interface 1600 depicts a map comprising a plurality of delivery destinations. Individual destinations 1604 comprise singular destinations. Multiple-stop destinations 1606 comprise a grouping of two or more destinations. Multiple-stop destinations 1606 are depicted with an icon that is different than the individual destinations 1604.

Multiple-stop destination information 1608 may be displayed in response to a selection of a multiple-stop destination. The multiple-stop destination information 1608 identifies an address for navigation. Stop information 1610 identifies a number of destinations that are grouped into the multiple-stop destination and a number of total items to be delivered. Destination controls 1612 in FIG. 16A comprise controls for marking a delivery to the group destination as completed or not completed, for deleting the group destination, for reviewing additional information about the multiple-stop destination, and for navigating to the multiple-stop destination.

Referring again to FIG. 15, at step 1510, a selection of the multiple-stop destination is received. The selection of the multiple-stop destination may include a selection through the graphical interface, a request to zoom in on the multiple-stop destination through the graphical user interface, and/or a selection made by the client device when a geo-location of the client device reaches an area proximate to the multiple-stop destination, such as during navigation.

Figure 16B:
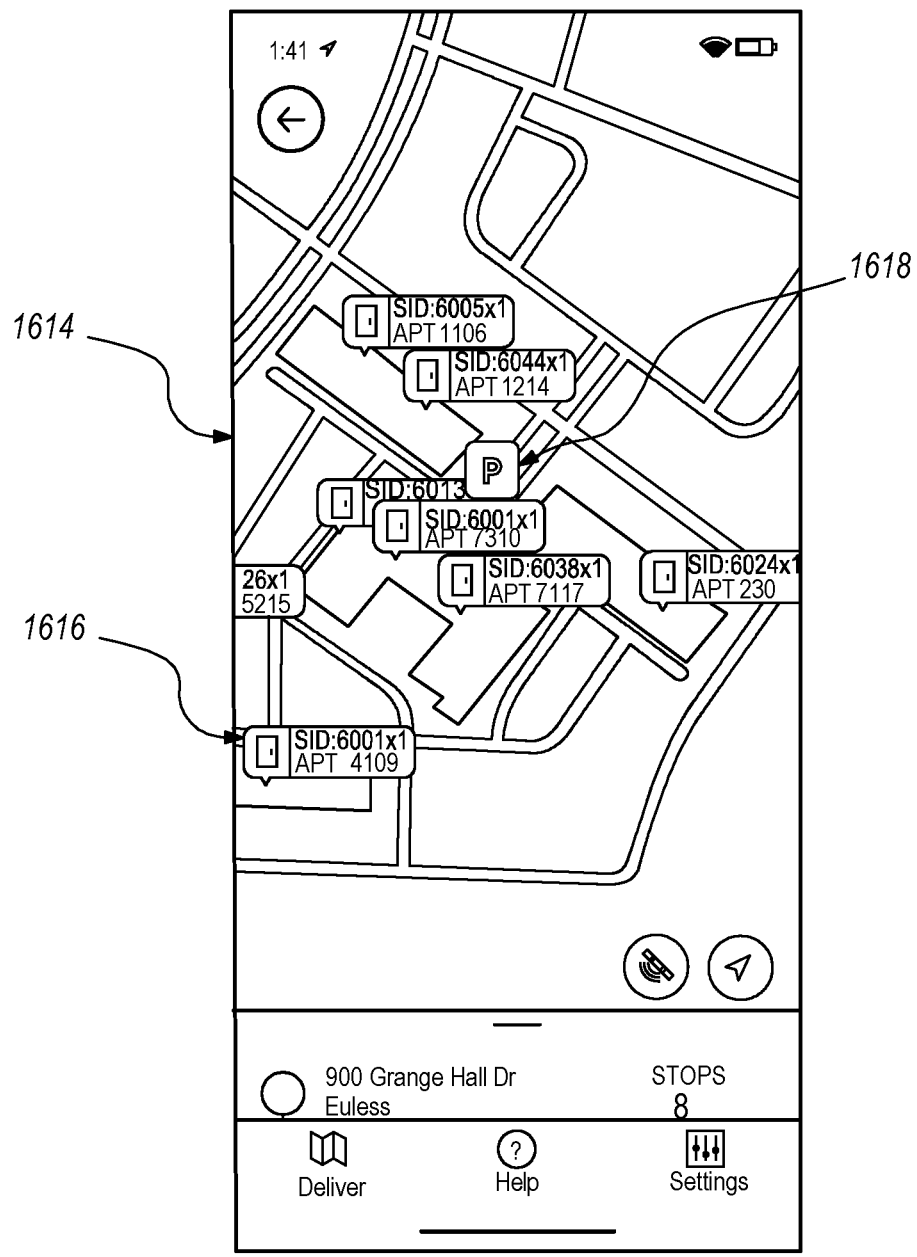
FIG. 16B depicts an example view of multiple destinations of a multiple-stop destination.

At step 1512, the pickup and delivery system causes display of an identifier of the first destination, the second destination, and the first semantic waypoint. For instance, in response to the selection of the multiple-stop destination, the system may display a zoomed map of the multiple-stop destination with individual identifiers for each location in the multiple-stop destination and an identifier of the shared semantic waypoint. FIG. 16B depicts an example view of multiple destinations of a multiple-stop destination. Interface 1614 depicts a map comprising a plurality of delivery destinations that were grouped into a single group destination. Individual destinations 1616 of the multiple-stop destination are depicted with an icon representing their geolocation. The map may show, for example, that an apartment 1106 and an apartment 1214 are located in the same building, which in turn is adjacent to two other buildings, one of which hosts an apartment 2304 and another hosts three other apartments. Semantic waypoint 1618 comprises a shared semantic waypoint for the plurality of destinations in the multiple-stop destination. The semantic waypoint is depicted with an icon representing its geolocation and the type of semantic waypoint. In FIG. 16B, semantic waypoint 1618 is a parking location which corresponds to the individual destinations 1616.

3.2. Example Optimized Routes

Figure 12:
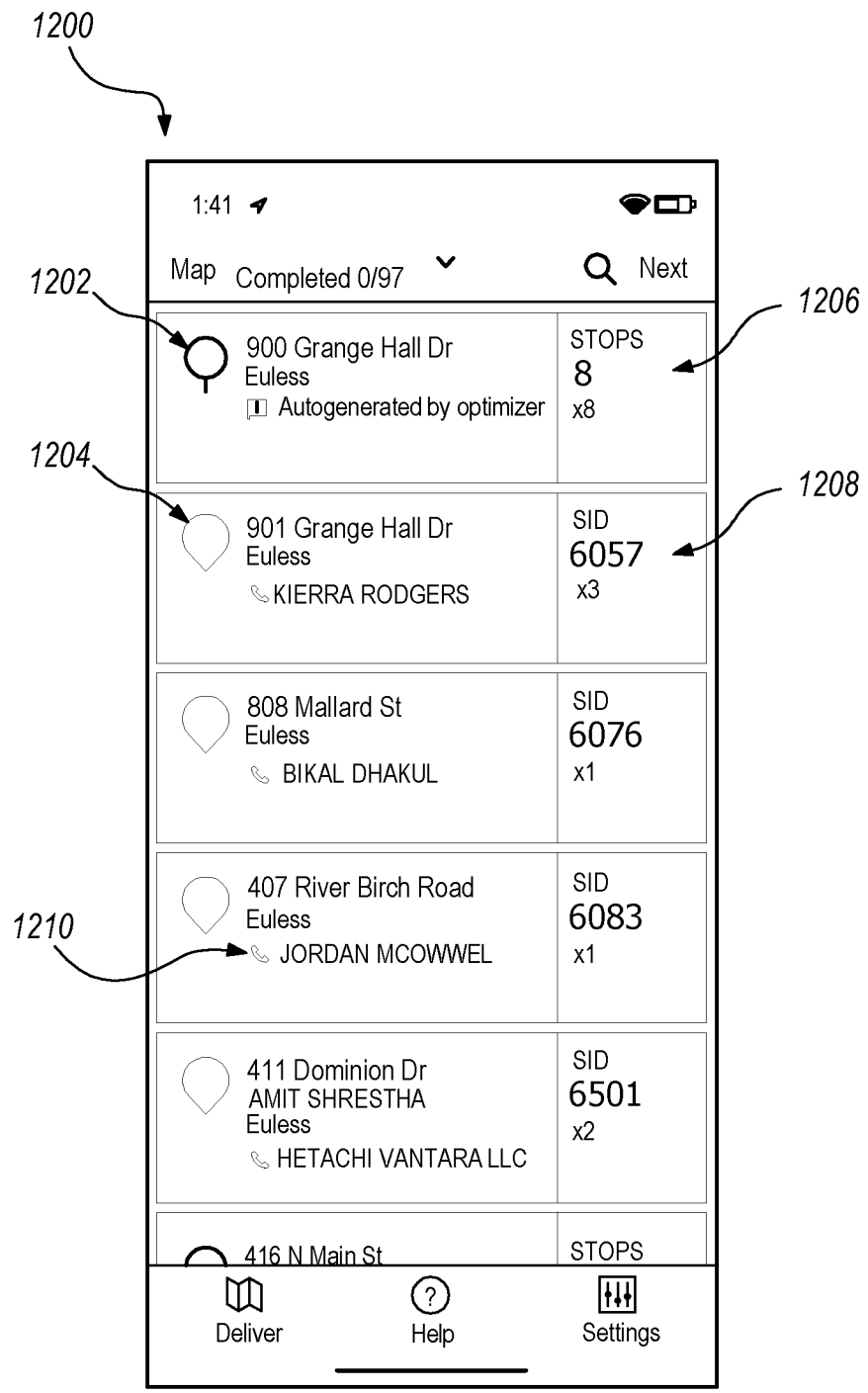
FIG. 12 is an example graphical user interface configured to display an optimized route.

FIG. 12 is an example graphical user interface configured to display an optimized route. The depicted example is provided to illustrate a simple implementation of presenting an optimized route in a graphical user interface and is not meant to limit the ways of presenting the optimized routes in any way. The graphical representations of an optimized route may vary and may depend on how many stops are included in the route, how many packages are going to be delivered at each stop, how much information is required to provide directions to each stop, how the stops need to be ordered along the optimized route, and the like.

In the example depicted in FIG. 12, an example route includes a multiple-stop and a few individual stops. Multiple-stop 202 is depicted using a circle, and the individual stops, like a stop 204, included in multiple-stop 202, are indicated using balloon icons. Other icons and representations may also be used to distinguish a multi-stop from the individual stops. The stops are shown in the same order as they are included along the optimized route. Hence, multi-stop 202 is shown on the top of the display; a first individual stop, i.e., stop 204 is shown below stop 202, and so on.

For each stop, several types of information may be provided. The information for a stop may include an address and detail contact information for the stop, a SID, and a count of the packages to be delivered to or picked up from the stop. Multiple-stops 1202 include stop information 1206 which identifies a number of stops and a number of items to be delivered in the multiple-stop. In contrast, the individual stops 1204 include an identifier corresponding to the delivery and a number of items to be delivered as part of the delivery. Individual stops 1204 may additionally include a call option. The call option 1210 in FIG. 10 includes a selectable option which, when selected, causes the client device to make an outgoing call to a phone number corresponding to the individual stop. The call option 1210 also identifies a name of the person to be called. Additional examples are described later.

3.3. Example Information about a Stop

Figure 13:
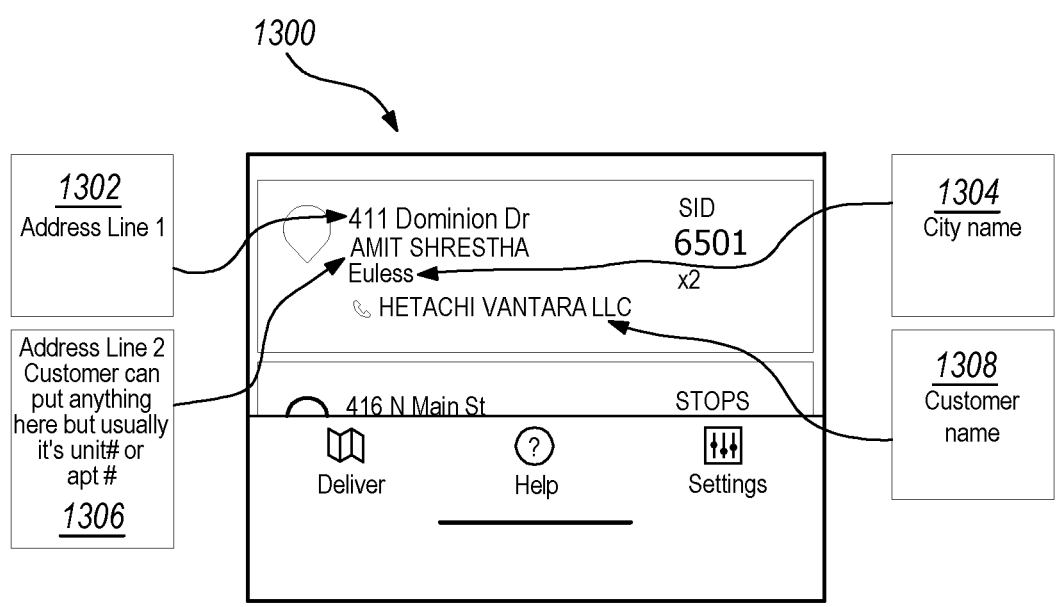
FIG. 13 is an example graphical user interface configured to display stop information of a stop included in an optimized route.

FIG. 13 is an example graphical user interface configured to display stop information for a stop included in an optimized route. The depicted example is provided to illustrate a simple example of displaying stop information using a graphical user interface and is not meant to limit the ways of presenting the information about stops in any way.

3.3.1. Stop Details

As shown in FIG. 13, interface 1300 depicts the stop information which may include a stop address comprising address line 1302 address line 1206, city name 1304, and customer name 1308. The address may be represented in the address format used by a customer who placed a delivery/pickup order. For example, the address may include a street address, a name of the city/town/village, an apartment number, and the like.

The stop information may also include a customer name or a business name of the entity that placed a delivery/pickup order. The stop information may also include a telephone number of the customer, a customer's email address, and other information allowing a driver to contact the customer. The stop information may also include a service identifier (SID) of the order placed by the customer and a count of packages to be delivered to or picked up from the stop destination.

3.3.2. Multiple Stops Details

Figure 17:
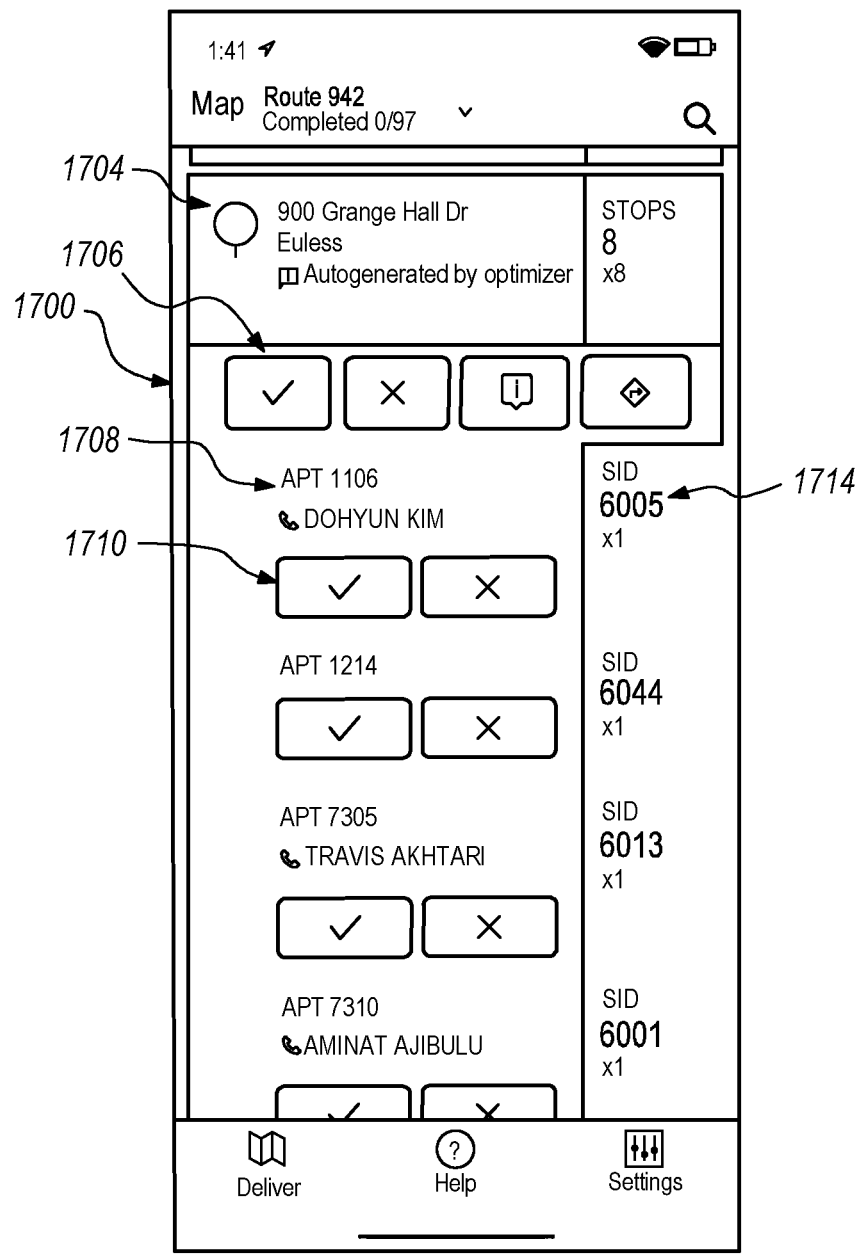
FIG. 17 is an example graphical user interface configured to display stop information and route status information for an optimized route.

FIG. 17 is an example graphical user interface configured to display stop information of a multiple-stop included in an optimized route. The depicted example is provided to illustrate a simple example of displaying stop information using a graphical user interface and is not meant to limit the ways of presenting the information about the stops in any way. As shown in FIG. 17, the information provided for a multiple-stop may include a city address of the multiple-stop destination, an indication that the information was autogenerated by an optimizer, and list of stops that are included in the multiple-stop. Furthermore, the information provided for the multiple-stop may include an indication that the multiple stop is within an apartment complex and provide information about the complex leasing office.

In the depicted example, the multiple-stop includes at least four individual stops: a stop at an apartment 1106, a stop at an apartment 1214, a stop at an apartment 7305, and a stop at an apartment 7310. For each of the individual stops, the graphical user interface provides a name of the customer and several interactive elements allowing a driver to indicate whether the scheduled delivery or the scheduled pickup was successful. Additional examples of multiple-stops are described later.

In some embodiments, the multiple-stop information may be superimposed with a map. The map may be displayed as adjacent to the information about the multiple stops, as an underlay background, or as a separate display generated once a driver requests the display of such a map.

A display 1700 may include information about multiple stops, information about a SID for each of the stops, information about a count of packages to be delivered at or picked up from the individual stops, and several interactive elements, including those described in the preceding figures. In addition, display 1700 may include a navigation window that may allow searching the routes using various criteria, such as a route status, a route completion indicator, and the like. The navigation window may also allow switching from the multiple-stop information to a map depicting the stops of the selected route.

Display 1700 in FIG. 17 includes multiple-stop overview data 1704, multiple-stop controls 1706, individual stop data 1708, individual stop identifier 1714, and individual stop controls 1710. Multiple-stop overview data 1704 may identify an address of the multiple-stop, a city of the multiple-stop, a number of stops in the multiple-stop, and/or a number of items to be delivered as part of the multiple-stop.

Multiple-stop controls 1706 comprise selectable graphical user elements that relate to the multiple stop. For instance, the first option, when selected, may cause the system to mark the multiple-stop and/or all of the individual stops in the multiple-stop as completed, the second option, when selected, may cause the system to mark the multiple-stop and/or all of the individual stops in the multiple-stop as incomplete, the third option, when selected, may cause the system to display additional information relating to the multiple-stop and/or display an option for inputting additional information about the multiple-stop, and the fourth control, when selected, may cause the system to display a navigation interface for navigating to the address of the multiple-stop. In an embodiment, the first and second options are configured to override individual selections made below, such that an individual stop that is marked as incomplete will be marked as completed when the first option is selected. In alternative embodiments, the system may be configured to only apply the selection of the first or second option of the multiple-stop controls to individual stops that were not already marked through input.

Individual stop data 1708 may include information relating to individual deliveries, such as an apartment number, a person to whom the delivery is being made, and/or an option for calling the person corresponding to the delivery. Individual stop identifier 1704 comprises an identifier corresponding to an individual delivery and/or a number of items to be delivered at the individual stop. Individual stop controls 1710 comprise selectable graphical user elements that relate to the individual stop. For instance, the first option, when selected, may cause the system to mark the individual stop as completed and the second option, when selected, may cause the system to mark the individual stop as incomplete.

3.4. Multiple-Stop Details

Figure 14:
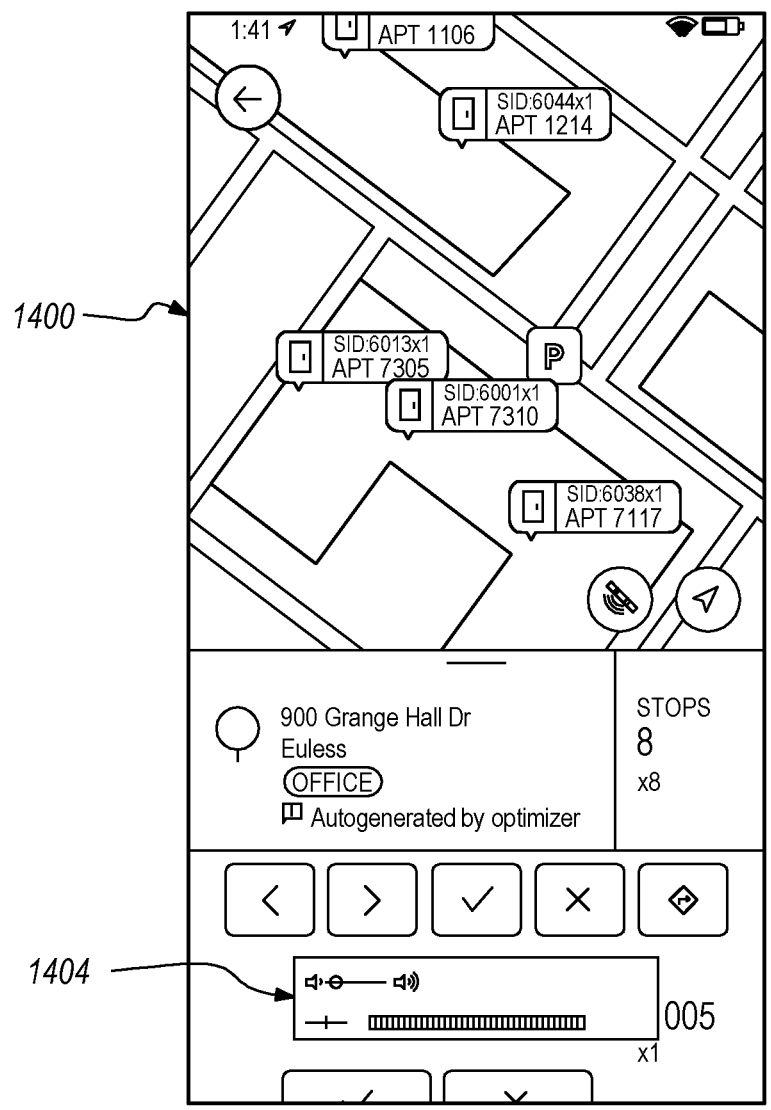
FIG. 14 is an example graphical user interface configured to display stop information of a multiple-stop included in an optimized route.

FIG. 14 is an example graphical user interface 1400 configured to display route information. A depicted display 1400 shows a multiple-stop information superimposed on a map of the apartments that are included in the route. Display 1400 may include several interactive elements including a scrolling-element for scrolling from one stop destination to another stop destination within the multiple-stop. Additional interactive elements may be configured as checkboxes that allow confirming that the delivery or pickup of the package at the stop has been successful. Furthermore, the interactive elements may be configured as selection boxes that allow a driver to access direction instructions for navigating from one stop to another stop.

In some embodiments, display 1400 may be configured with audio controls 1402 configured to record and playback messages. The messages may include pre-recorded service instructions or direction instructions for a route or a stop. The messages may also include messages recorded by a driver as the driver attempts to deliver/pick up a package at a stop. The audio controls may also include a volume-scroll-element, a pause-element, a play-element and the like.

3.5. Navigation Instructions

Figure 18:
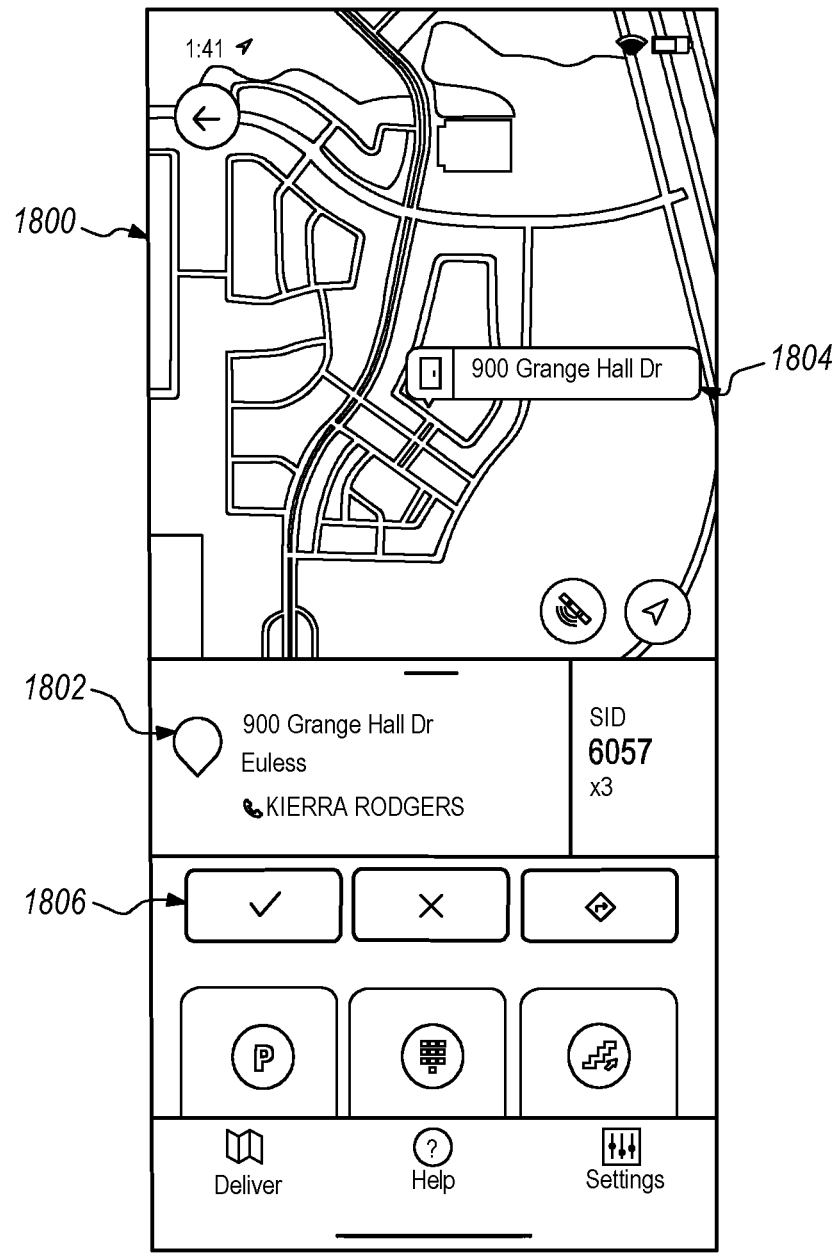
FIG. 18 is an example graphical user interface configured to display navigation instructions.

FIG. 18 is an example graphical user interface 1800 configured to display navigation instructions. A display 1800 depicts a split window having two portions: an upper portion and a lower portion. The upper portion is used to display a map that shows a stop 1804 and the stop's geolocation within the surrounding area. The stop may be depicted using an arrow icon or any other graphical element pointing to the address of the stop. In some embodiments, a physical address of the stop may be displayed next to the arrow icon or next to the pointer pointing to the location. The types of the maps may include satellite maps, geographical maps and the like. A driver may switch between the types of the maps by selecting, for example, a satellite icon displayed on display 1800 and allowing switching between a geographical map and a satellite map.

The lower portion of display 1800 may include stop details 1802. Examples of stop details 1802 were described in FIG. 17. Controls 1806 may comprise controls for indicating an individual stop, controls for indicating an individual stop has not been completed, and/or an option to display navigation to the stop 1804.

Referring again to FIG. 18, navigation information may include one or more semantic waypoints, such as information about a location of a parking spot that is conveniently located and accessible to a driver who needs to deliver a package to the stop. In some implementation, upon selecting an interactive element labelled, for example, with a letter P, a driver may receive written or spoken instructions about the location of the conveniently located parking and/or the system may display a location of the parking location on the map. The instructions may provide navigation directions for reaching the parking location from a current location of the driver.

In some embodiments, navigation information may include information about access codes that a driver may need to access, for example, the apartment complex in which a stop is located. If a building is in an apartment complex that has its own security gate, then to access the building, the driver needs to obtain the access code that is valid for that building. To access that code, the driver may select, from the graphical user interface displayed on the driver's portable device, an interactive element that is labelled with, for example, a keypad icon. Once that element is selected, the graphical user interface may display the access code, which the driver may use to access the building.

In some embodiments, a driver may request resetting an access code and/or requesting that a new access code be provided. Additionally, if for some reason, the provided access code does not work for accessing the building, then the driver may contact, for example, a leasing office of the apartment complex and ask for help or to let the driver access the building without providing a valid access code.

Navigation information shown in display 1800 may also include information about a location of a staircase that is conveniently located and accessible to a driver who needs to deliver a package to the stop. In some implementation, upon selecting an interactive element labelled, for example, with an arrow icon, a driver may receive written or spoken instructions about the convenient location of the staircase. The instructions may provide a guidance for reaching the staircase from a current location of the driver.

Additional navigation information not depicted in display 1800 may also be included. For example, the additional navigation information may include information about the best time to reach a customer residing at the stop location, information about a backup contact person, and the like.

3.6. Delivery/Pickup Status Information 3.6.1. Status Checkboxes

Figure 19:
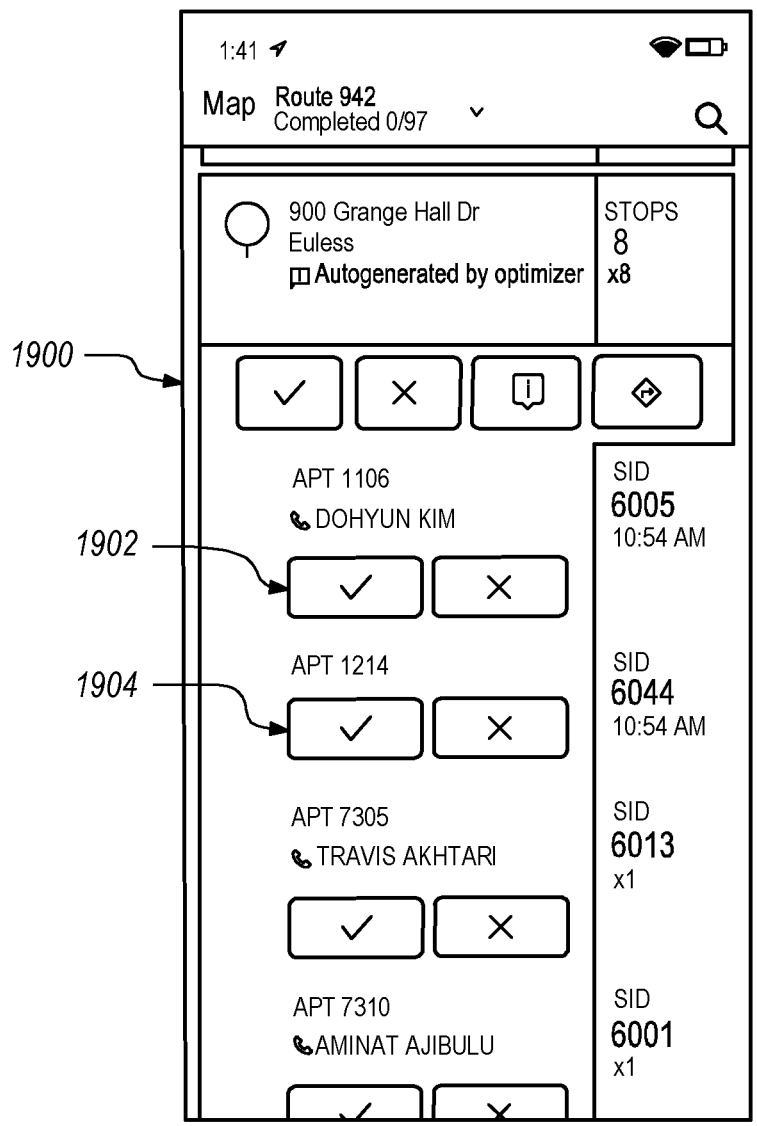
FIG. 19 is an example graphical user interface configured to display stop information of a multiple-stop included in an optimized route.

FIG. 19 is an example graphical user interface 1900 configured to display stop information of a multiple-stop included in an optimized route. A depicted map shows color coded information reflecting a delivery/pickup status for an optimized route. The map shows a multiple-stop route starting at 900 Grange Hall Driver in Euless. A circle shown next to the address may be color-coded: one color may be used to depict the portion of the route that has not been completed yet; another color may be used to depict the portion of the route that has been already successfully completed; other color may be used to depict the portion of the route that has not been successfully completed.

In the example shown in FIG. 19, the multiple stops include an apartment 1106, an apartment 1214, an apartment 7305, and an apartment 7320. In the depicted example, a graphical user interface shows a completed-delivery checkbox 1902 indicating that a driver has already made a delivery/pickup at the apartment 1106. This is reflected by showing that the completed-delivery checkbox is checked, and marking that checkbox, a corresponding SID and a portion of the route circle with the same color, such as a green color. Furthermore, the graphical user interface may display the time at which the delivery or the pickup took place at the stop.

Also, in the depicted example, graphical user interface 1900 shows an incomplete-delivery 1904 that the driver has not been successful in delivering or picking up a package at the second stop, i.e., at the apartment 1214. This is reflected by showing the incomplete-delivery checkbox is checked, and marking that checkbox, a corresponding SID and a portion of the route circle with another color, such as a red color. Furthermore, the graphical user interface may display the time at which the delivery or the pickup at the stop was attempted.

In the depicted example, graphical user interface 1900 may also show indications of the stops that the driver needs to make to complete the route. This is reflected by showing that neither a complete-delivery checkbox nor an incomplete-delivery checkbox is checked and marking a corresponding SID and a corresponding portion of the route circle with other color, such as a gray color.

3.6.2. Parking/Entrance/Staircase Information

Referring again to FIG. 20, that shows example graphical user interface 702 configured to display route navigation information, depicted display 2000 includes an apartment number, a name of a customer who placed an order for a delivery or pickup at the apartment, a SID number of the order, and several navigation elements. The navigation elements 2002 include an interactive element to navigate to a previous stop (i.e., a previous apartment stop along the route and/or a previous stop of a multiple-stop) and an interactive element to navigate to a next stop (i.e., a next stop along the route and/or a next stop of a multiple-stop). The navigation elements 2002 may also include a complete-delivery checkbox and an incomplete-delivery checkbox that may be used to indicate whether a delivery, or a pickup, to the apartment 7305 was successful or not.

In some embodiments, the navigation elements also include semantic waypoint options 2004. Semantic waypoint options 2004 in FIG. 20 comprise a parking-interactive element, an entrance-access-code-interactive element, a staircase and floor indicator element, and the like. Semantic waypoint options 2004 may display information relating to the semantic waypoints, such as cost of parking, a gate or door code, availability of stairs or elevators, and/or floor of the unit. The semantic waypoints may be editable. For example, in response to a selection of a semantic waypoint, the system may cause display of an interface to change, update, or add information to the semantic waypoint. Furthermore, the navigation elements may include an interactive element for adding a note 2006. The note 2006 may be provided by a driver who attempts to make a delivery at an address, instructions for making the delivery at the address, reporting message from the driver to the system coordinator or a manager, and the like.

Figure 21:
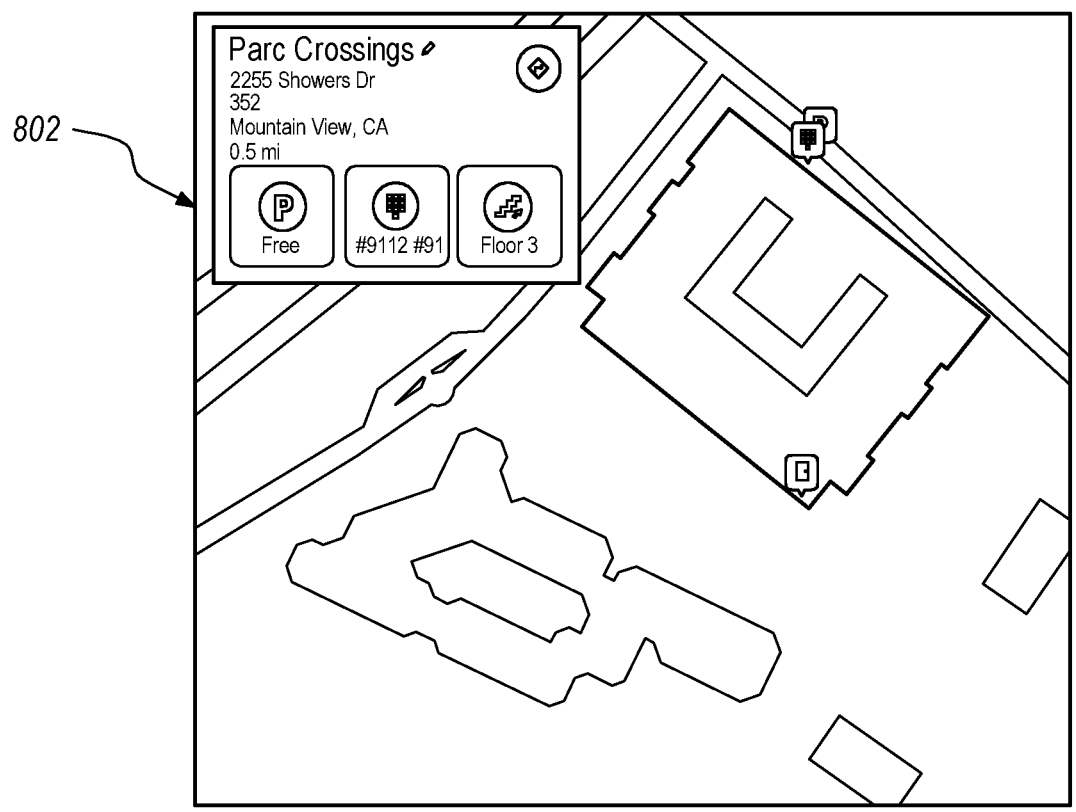
FIG. 21 is an example graphical user interface configured to display route navigation information superimposed on a map.

3.7. Route Navigation Superimposed on a Map 3.7.1. Navigation Superimposed on a Map FIG. 21 is an example graphical user interface 802 configured to display route navigation information superimposed on a map. A depicted map shows a navigation graphical interface superimposed on a map showing an apartment complex. Superimposing the navigation instructions onto the map allows a driver to visualize the locations of the objects of interest, such as a parking, lock boxes, staircases, and the like, on the map of the apartment complex with respect to the driver's own location. The map shown in FIG. 21 is a satellite map; other maps, however, may also be used.

Referring to FIG. 21, suppose that a driver is attempting to make a delivery to apartments in an apartment complex and wants to know where s/he can find a parking that is conveniently located with respect to a first stop along the route. The relative locations of the objects of interest may be depicted on the map. The driver's own location may be depicted using a black-and-white icon, while the parking may be depicted using an icon having a P letter, and the lockbox may be depicted using an icon having a keypad icon on it. The relative depictions of the objects of interest may allow the driver to quickly find each of the objects and arrive at the stop as quickly as possible.

Figure 22:
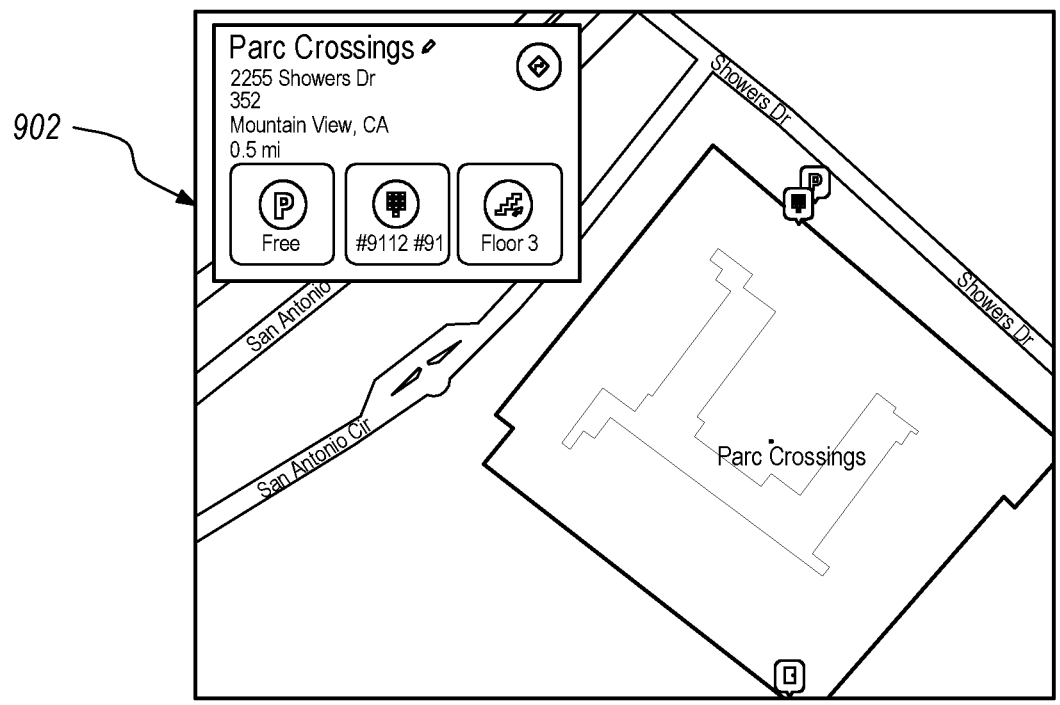
FIG. 22 is an example graphical user interface configured to display route navigation information superimposed on a map.

FIG. 22 is an example graphical user interface 902 configured to display route navigation information superimposed on a map. Depicted display 902 is a detail view of display 802 shown in FIG. 21, with the exception that the background map in FIG. 22 is a geographical map, while the background map in FIG. 21 is a satellite map.

3.7.2. Apartment Information Superimposed on a Map

Figure 23:
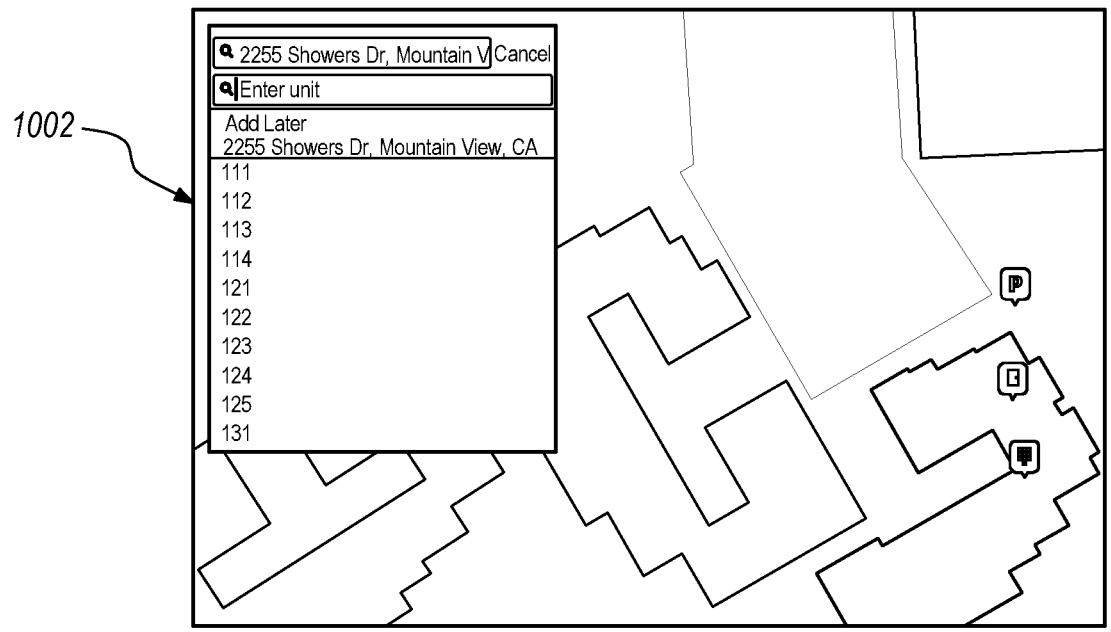
FIG. 23 is an example graphical user interface configured to display apartment information superimposed on a map.

FIG. 23 is an example graphical user interface 1002 configured to display apartment information superimposed on a map. Depicted display 1002 shows a list of apartment numbers of an apartment complex that are included in a route. The list is superimposed on a map showing the apartment complex. The map also shows a current location of the driver, a location of the lockbox in the apartment complex, and a location of the convenient parking.

In some embodiments, display 1002 may be updated by selecting a different route. For example, a driver may select an interactive search element and type in, or select from a list, a different route. Then, the driver may request an update of display 1002 to show the information pertaining to the newly selected different route.

Figure 24:
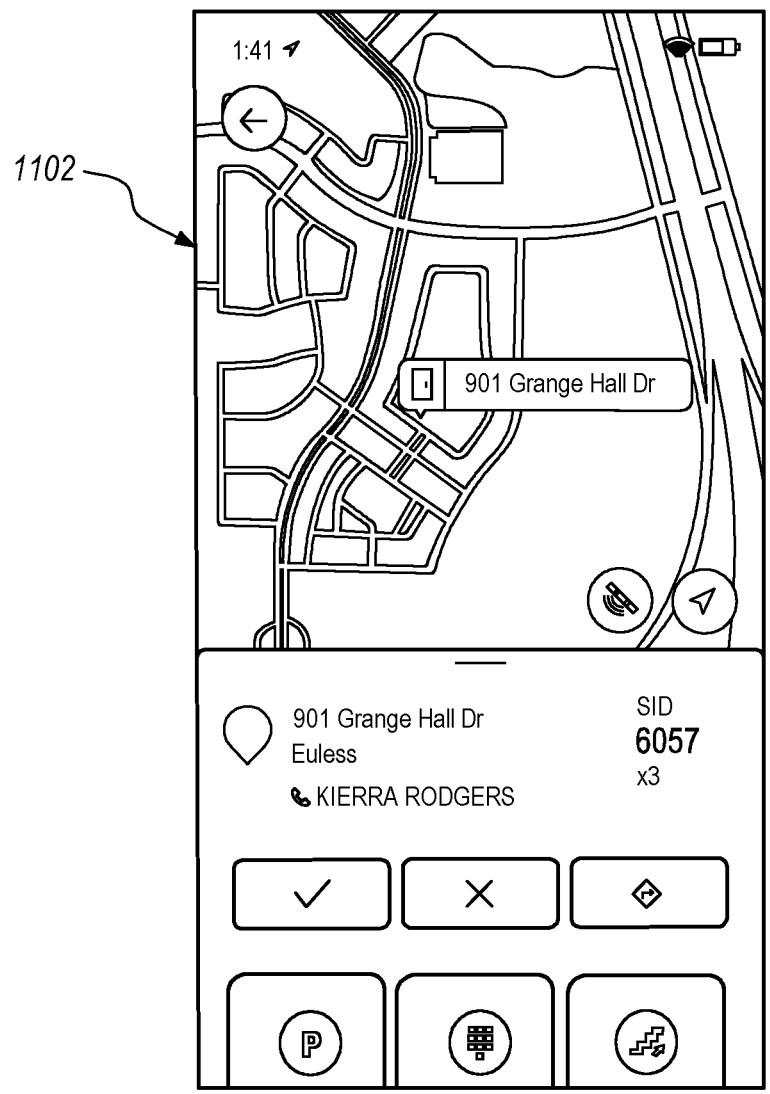
FIG. 24 is an example graphical user interface configured to display apartment navigation information superimposed on a map.

FIG. 24 is an example graphical user interface 1102 configured to display apartment navigation information superimposed on a map. Depicted display 1102 shows a satellite view of a portion of the apartment complex and information about a location of the stop superimposed on the satellite map of the apartment complex. The selection between the satellite map and the geographical map may be facilitated using a toggle shown as, for example, an icon depicting a satellite.

Display 1102 may also include other navigation interactive elements. The examples of the navigation elements are described above.

4. Example Route Optimization Flow Chart

Figure 25:
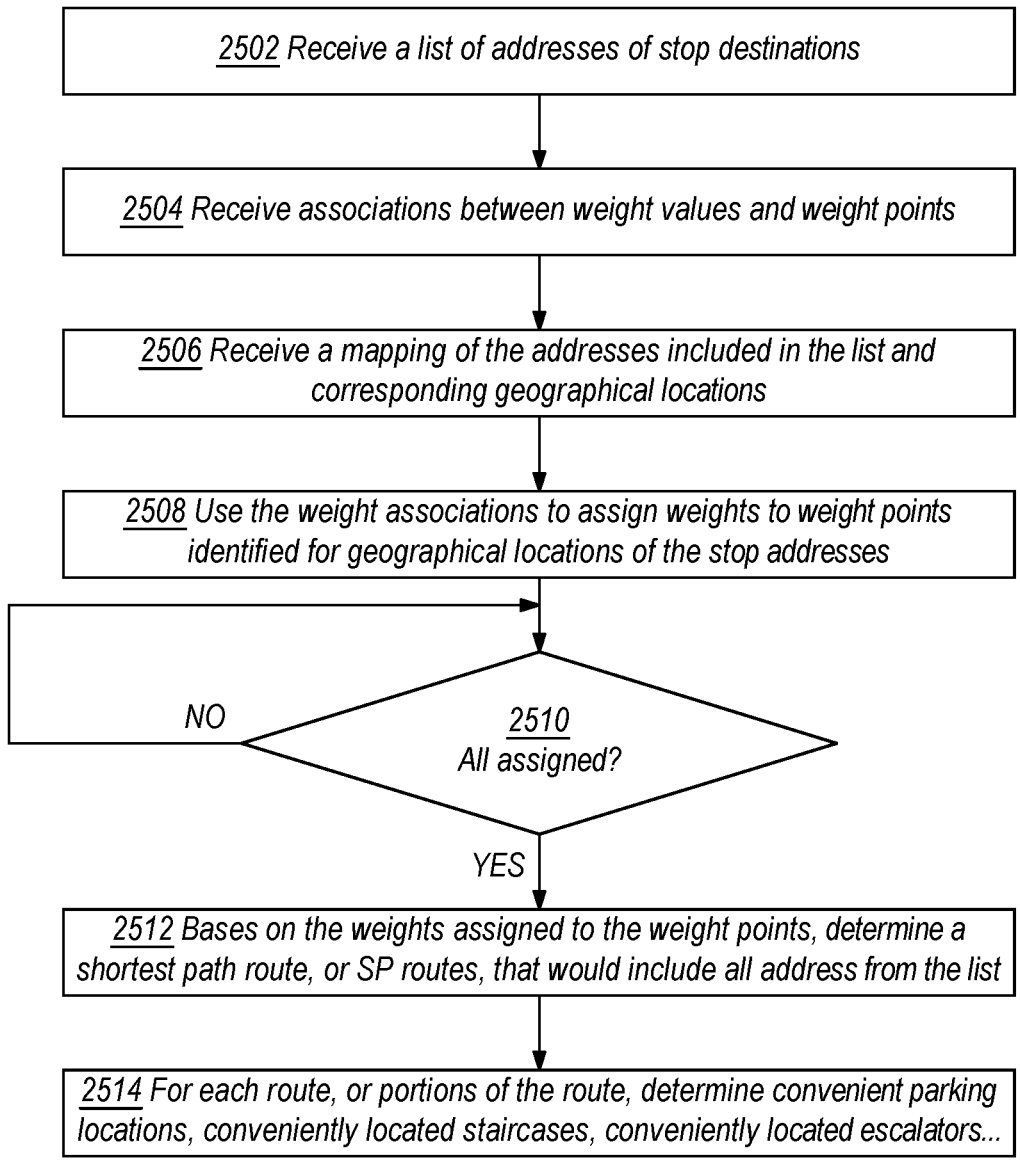
FIG. 25 is a flow chart of an example process for a route optimization.

FIG. 25 is a flow chart of an example process for a route optimization.

4.1. Initialization

In step 2502, a list of addresses of stop destinations is received. The list may be generated based on the orders received for deliveries and pickups that are to be serviced on a particular day and in a particular city or town. The list may include addresses of individual residences, business establishments, apartment units, condominium units, and the like.

In step 2504, a list of associations between weight values and waypoints is received. A weight point may be any type of characteristics that may be identified for a delivery/pickup stop. The waypoints may include, for example, an elevation characteristic of the elevation of the stop location, a parking location characteristic associated with the stop location, a lobby location characteristic associated with the stop location, an accessibility characteristics associated with the stop location, an escalator characteristic associated with the stop location, a staircase characteristic associated with the stop location, and the like.

The weights associated with the waypoints may be represented using, for example, float numbers from a float number range. The weight values may vary and may depend on the spatial relationship between the locations and the importance of the characteristic of the locations. For example, for a particular viewpoint, such as a particular parking location, the addresses located closer to the parking location may have higher weights than the addresses located further away from the parking location. The weights may be selected in such a way that they would allow grouping the stops to find, for example, a shortest path that connects the stops along the path.

In step 2506, a mapping between the addresses included in the list of addresses and geographical locations of the corresponding addresses is received. The mapping may be generated based on various maps, including satellite maps, geographical maps, detail maps, and the like. The geographical locations may be expressed using values of a latitude and longitude coordinate system and used to determine positions or locations of the stops in relation to the Earth's surface. Also, in this step, for each address, based on the corresponding latitude and longitude values, a set of characteristics is determined.

4.2. Route Optimization

In step 2508, for each address from the list of addresses, and for each characteristic determined for the address location, a weight is selected from the set of associations between the weight values and waypoints. The process of assigning the weights to the waypoints corresponding to the characteristics of the address locations is repeated for each characteristic of an address, and then for each address from the list of addresses. Once all waypoints of all address locations have assigned weights, then step 2512 is performed. Otherwise, the step 2508 is repeated and the test is repeated in step 2510.

In step 2512, based on the weights assigned to the waypoints, one or more shortest-path routes are determined for the addresses. For example, based on the weights assigned to the waypoints, the addresses from the list of addresses are grouped into groups based on their semantic connections (described later), and for each group of the addresses, a route including the addresses from the group may be determined. Specifically, if a list of addresses includes three addresses and all addresses are included in the same group (e.g., the addresses are in the same building), but the addresses are on different "elevations" (e.g., a first address is on a second floor, a second address is on a first floor and a third address is on a third floor), then an optimized route might include all three addresses in the following order: the second address stop, the first address stop and the third address stop.

4.3. Route Detail Determination

In step 2514, for each route, or each portion of the route, if the route is not cohesive, a convenient parking location is determined. Furthermore, for each route, or a portion of the route, a conveniently located staircase and/or a conveniently located escalator are determined. Moreover, for each route, or a portion of the route, an access code to the building or a lockbox is obtained, and additional access information is obtained.

5. Example Address Grouping Based on Semantic Connections

Address grouping based on semantic connections may be performed by applying one or more classes of semantic characteristics. For example, the addresses in a list of addresses may be grouped using semantic-based clustering. Other approaches may include grouping by a geo-location and a proximity of the addresses to each other. Other approaches may include grouping by a street address, an apartment complex address, a business park address, and the like.

Semantic-based clustering aims to group the stop addresses into a set of address clusters. The semantic-based clustering may be based on the cognitive science and graph theory. In some implementations, the semantic-based clustering applies a computational cognitive model of semantic association for semantic associations and using the model to develop a vector-based model for semantic learning and semantic grouping modeling. These may be used to develop cognitive graphs that utilize, for example, a weight value-to-waypoints association. Then, based on the graph representing the semantic connections and dependencies between the addresses, the addresses may be grouped into semantically-related groups. For example, two addresses that may be on different streets may be semantically connected because they both belong to the same apartment complex. According to another example, two addresses that are on the same street may belong to different semantic groups because the street is closed between the two addresses.

Figure 26A:
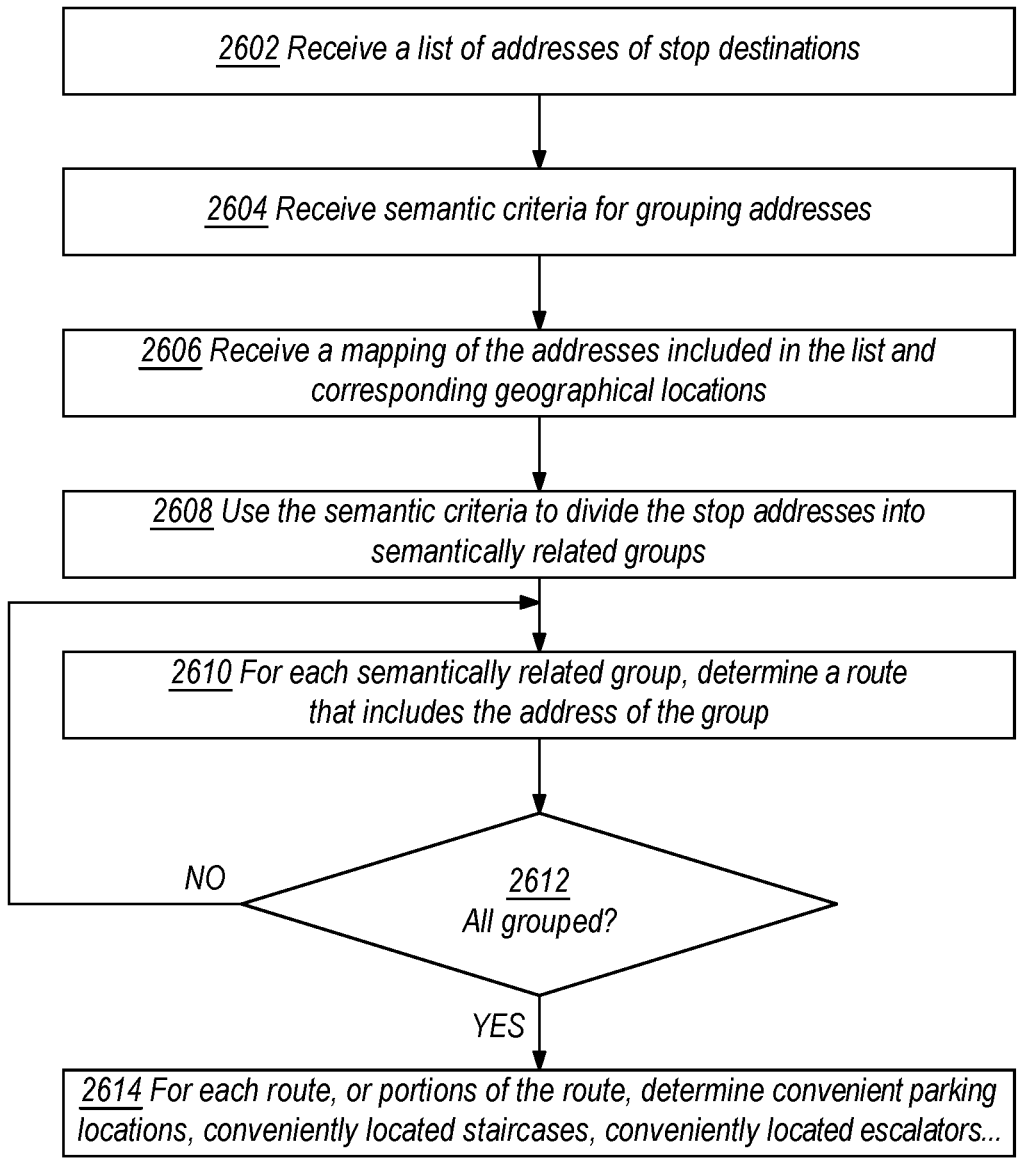
FIG. 26A is a flow chart of an example process for address grouping based on semantic connections for a route optimization.

FIG. 26A is a flow chart of an example process for address grouping based on semantic connections for a route optimization

5.1. Initialization

In step 2602 a list of addresses of stop destinations is received. The list may be generated based on the orders received for deliveries/pickups that are to be serviced on a particular day and in a particular city or town. The list may include addresses of individual residences, business establishments, apartment units, condominium units, and the like.

In step 2604, a list of semantic criteria for grouping is received. Semantic criteria may comprise identifiers of calls to programmed tests, methods, functions or routines that evaluate whether items are similar in meaning even if objective data identifying the items are different. The semantic criteria may include criteria that may be correlated to waypoints, described above. A weight point may be any type of characteristics that may be associated with a delivery/pickup stop. The selection of the semantic criteria may depend on the semantic-based grouping algorithm that is selected for the implementation. For example, if a semantic grouping by clustering is selected, then the semantic criteria may include: belonging to the same apartment complex, belonging to the same subdivision, belonging to the same management company, being managed by the same leasing office, being owned by the same owner, having the same postal code, having the same access to a lockbox or a security gate, and the like.

In step 2606, a mapping between the addresses included in the list of addresses and geographical locations of the corresponding addresses is received. The geographical locations may be expressed using values of a latitude and longitude coordinate system used to determine a position or a location of stops in relation to the Earth's surface.

5.2. Address Grouping

In step 2608, the selected semantic criteria are used to divide the addresses of the list of addresses into semantically related groups. For example, each address of the list of addresses may be assigned a set of weights, each weight corresponding to a semantic criterion of the semantic criteria. Hence, if one of the selected criteria is 'belonging to a first apartment complex' and all apartment addresses from the list belong to either the first apartment complex or a second apartment complex, then the addresses of the apartments that belong to the first apartment complex will have relatively high weights assigned to them, while the addresses of the apartments that do not belong the first apartment complex will have relatively low weights assigned to them.

In step 2610, those addresses that have relatively high weights assigned to them may be grouped into one group and assigned to the same route. Determining whether a particular address has a relatively high weight may include comparing a cumulative weight of all weights assigned to the waypoints identified for the particular address with a cutoff weight, which may be determined ahead of time. The addresses that have their corresponding cumulative weights exceeding the cutoff weight may be included in a first group.

The addresses that have been already grouped may be removed from the list of addresses to avoid regrouping of the same addresses again in the next iteration. The resulting list of addresses is referred to herein as a modified list.

Then, the process of assigning the weights may be repeated for the modified list with respect to a second criterion, such as 'belonging to the second apartment complex.' Those addresses, from the modified list, that have their corresponding cumulative weights exceeding a cutoff weight may be included in a second group.

By repeating that process for all criteria, all the addresses in the list of addresses may be grouped into groups. If some groups overlap with each other, then the process may be repeated using more strict cutoff values for the weight values in determining whether an address satisfies or not a criterion.

In step 2612, a test is performed to determine whether the modified list of addresses includes any addresses, i.e., whether the modified list of addresses includes the addresses that have not been grouped yet. If all addresses have been grouped, then step 2614 is performed. Otherwise, the grouping is repeated for the modified list of addresses in step 2610. Once the grouping of the addresses is completed, each group of the addresses is assigned its own route.

For each route, a route optimization may be performed to, for example, determine an order of the addresses in which the addresses need to be included in the route to satisfy certain optimization criteria. The optimization criteria may include a shortest path criterion, a shortest time criterion, and the like.

For example, if a route includes four addresses that are semantically connected and thus belong to the same group, then a list of the four addresses may be provided as an input to a route optimization application executing, for example, the flow depicted in FIG. 25. Once the optimized route is determined, the four addresses are ordered in the route in such a way that servicing all corresponding stops along the route would be optimized in terms of the shortest path, the shortest time, or the like.

5.3. Route Detail Determination

In step 2614, for each route, or each portion of the route a convenient parking location is determined. Furthermore, for each route, or a portion of the route, a conveniently located staircase and/or conveniently located escalator are determined. Moreover, for each route, or a portion of the route, an access code to the building or a lockbox is obtained, and additional access information is obtained.

5.4. Semantic Grouping Flow

Figure 26B:
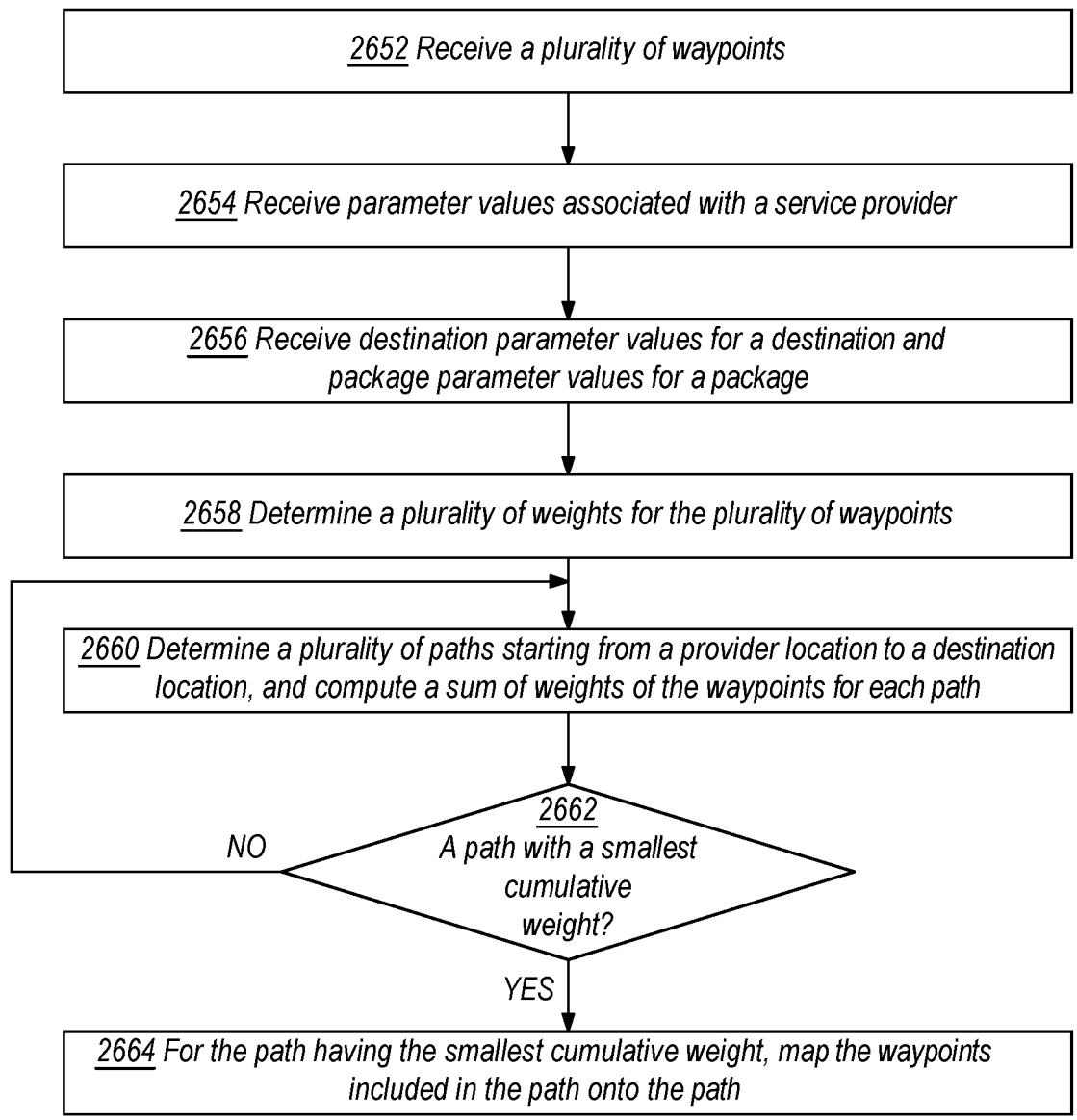
FIG. 26B is a flow chart of an example process for address grouping based on semantic connections for a route optimization

FIG. 26B is a flow chart of an example process for address grouping based on semantic connections for a route optimization. In step 2652, a plurality of waypoints is received. In some embodiments, each waypoint of the plurality of waypoints comprises one or more waypoint parameter values selected from a plurality of waypoint parameter values, one of which includes waypoint geographical location information of the waypoint.

In some embodiments, the plurality of waypoint parameter values is associated with a plurality of waypoint parameter categories and the plurality of waypoint parameter categories comprises: a geographical location category, a society gate category, an entrance category, a doormen category, a stairways category, an elevator category, a parking category, a backyard category, a balcony category, a playground category, a swimming pool category, and a package room category.

In step 2654, parameter values associated with a service provider are received. A particular provider parameter values, of the one or more provider parameter values, includes a provider geographical location. The one or more provider parameter values is associated with one or more provider parameter tags. The one or more provider parameter tags comprise: a geographical location tag, a society gate tag, an entrance tag, a doormen tag, a stairway tag, an elevator tag, a parking tag, a backyard tag, a balcony tag, a playground tag, a swimming pool tag, and a package room tag.

In step 2656, destination parameter values for a destination are received and package parameter values for a package are received. The one or more package parameter values are associated with one or more package parameter categories. The one or more package parameter categories comprise: a food category, a medicine category, a signature-required item category. The one or more destination parameter values is associated with one or more destination parameter categories.

In step 2658, a plurality of weights for the plurality of waypoints is determined. The weights may be assigned to the waypoints based on the waypoint parameter categories such as: a geographical location category, a society gate category, an entrance category, a doormen category, a stairways category, an elevator category, a parking category, a backyard category, a balcony category, a playground category, a swimming pool category, and a package room category.

In step 2660, a plurality of paths starting from a provider location to a destination location is determined, and a sum of weights of the waypoints for each path is computed. The one or more paths may be determined by executing an optimization algorithm using one or more constraints and applied to at least the plurality of waypoints and the plurality of weights for the plurality of waypoints. The one or more constraints include one or more of: a shortest time, a shortest distance, a specific time of day, a specific day of week, or a specific delivery type. A particular cumulative weight for the particular path is computed by adding one or more weights associated with one or more waypoints included in the particular path.

In step 2662, from the plurality of paths, a particular path with a smallest cumulative weight is selected. If such a path cannot be selected, then step 2660 is repeated to adjust the weights and recompute the sum of weights for the waypoints.

In step 2664, for the particular path having the smallest cumulative weight, the corresponding waypoints included in the particular path are mapped onto a particular route. The particular route starts from the provider geographical location and ends at the destination geographical location and indicates a service route for delivering the package to the destination. The particular route is the route that a delivery service tasker would follow to deliver the package.

6. Note Entering Capabilities

The capabilities to enter and save custom notes in GUIs that are precise and can present relevant information for repeated deliveries had not been implemented until now. In some embodiments, the presented approach allows a driver, who makes a delivery to a particular destination, enter waypoint notes (pertaining to, for example, an elevator, an entrance gate code, etc.) and have the notes associated with the destination and/or the destination address. The entered information may be made available to the driver automatically each time a delivery is scheduled to the same destination and/or the address in the future. All the previously provided notes may be then displayed using a GUI on a map view.

Figure 27:
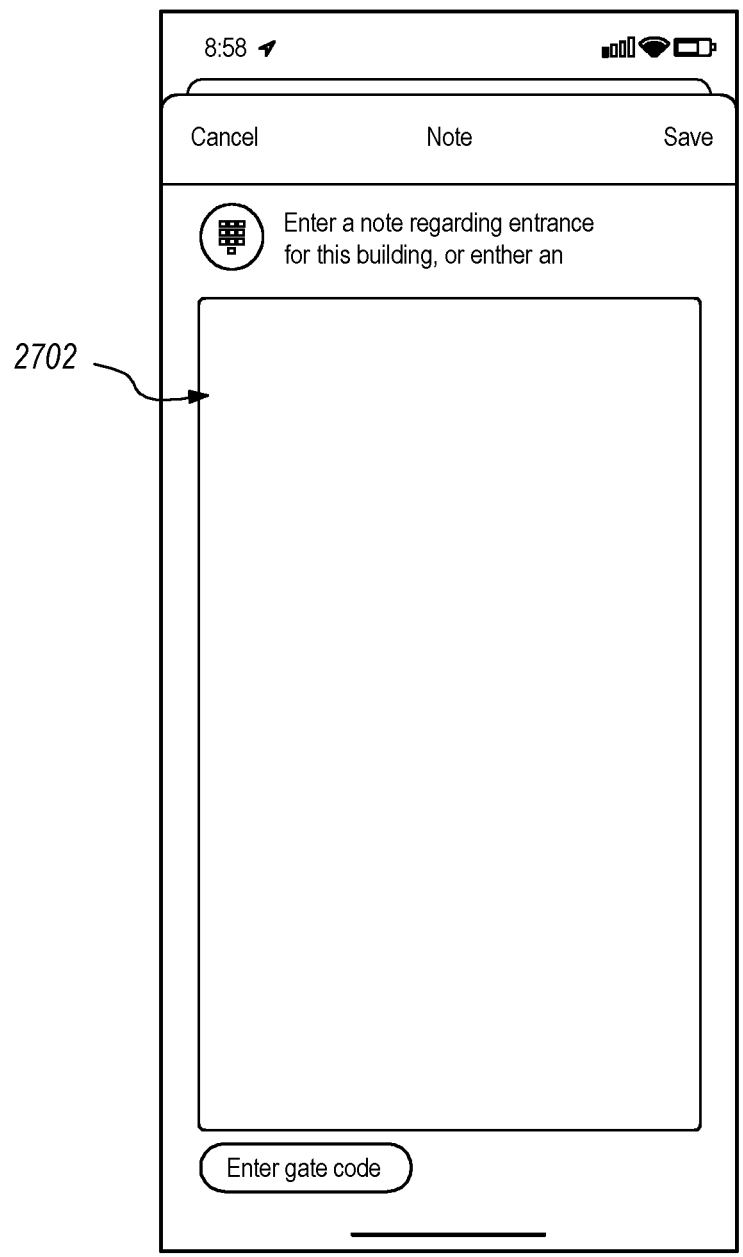
FIG. 27 is an example graphical user interface configured to provide note entering capabilities.

FIG. 27 is an example graphical user interface configured to provide note entering capabilities. In the depicted example, the example graphical user interface allows a driver to enter a numeric gate-code number. Upon pressing a bottom button labeled with "Enter gate code," a number keypad is displayed. Alternatively, the driver may enter the notes into a field 2702, by jotting them directly into the screen which is a touch-sensitive pad.

Figure 28:
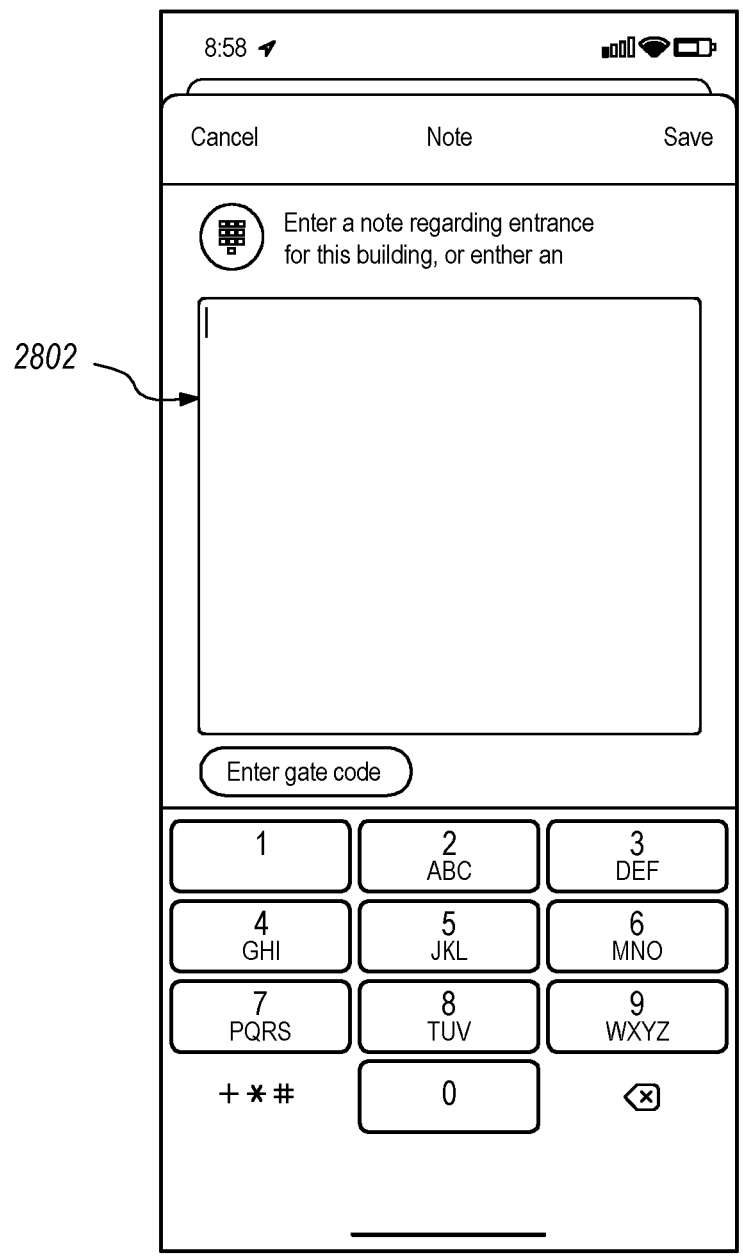
FIG. 28 is an example graphical user interface configured to provide note entering capabilities.

FIG. 28 is an example graphical user interface configured to provide note entering capabilities. In the depicted example, the example graphical user interface shows a number keypad to enter a gate code after a "Enter gate code" button is pressed. The driver may enter the gate code using the keypad, and the entered number will show in a field 2802. Then the inputted gate code, or any other information, can be saved once the driver presses a top-right "Save" button.

Figure 29:
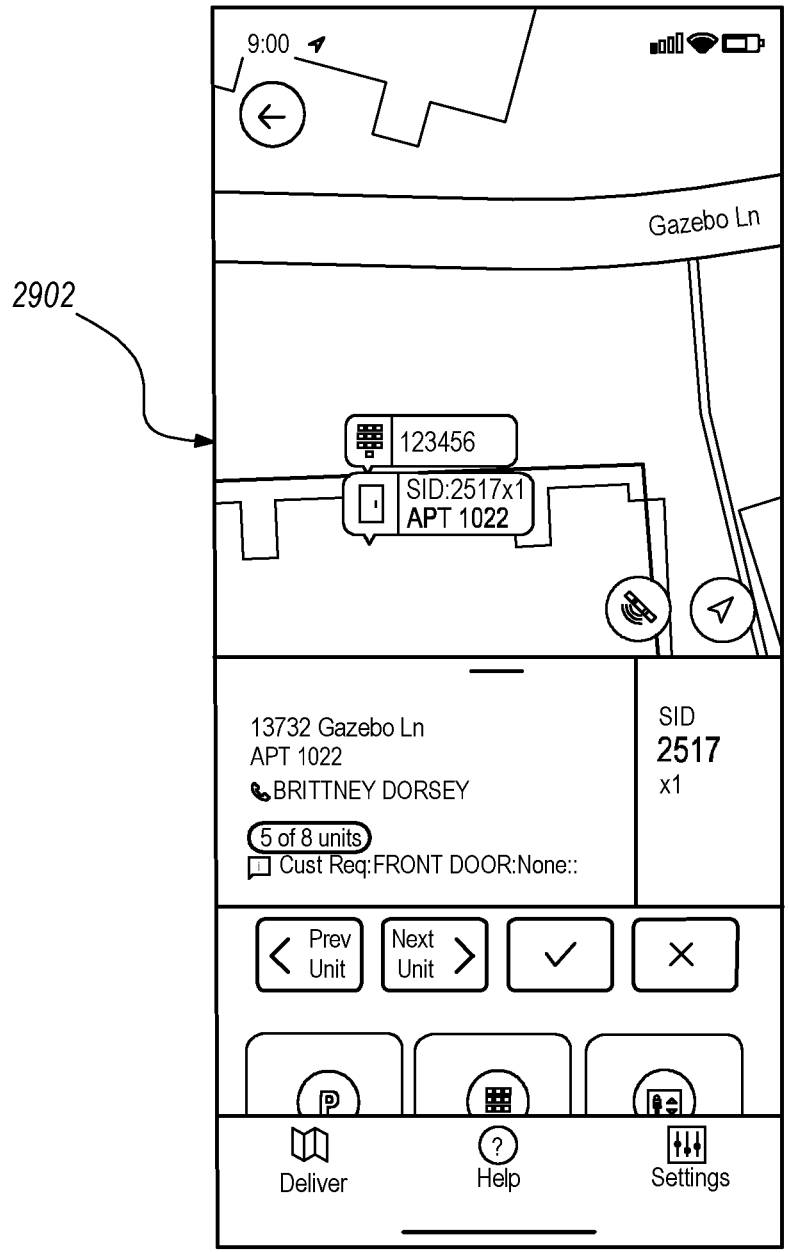
FIG. 29 is an example graphical user interface configured to provide note entering capabilities.

FIG. 29 is an example graphical user interface configured to provide note entering capabilities. The depicted example shows a special icon labelled as the "Entrance" icon in a map to indicate that a gate code has been saved for the corresponding address. The "Entrance" icon may be color-coded and may be shown as a keypad along with the actual gate code. The newly added data is tethered to the corresponding destination address of the delivery/pickup property for future deliveries to the same address and will be available and visible to the driver in a map view as a pin drop displayed over the destination address.

Figure 30:
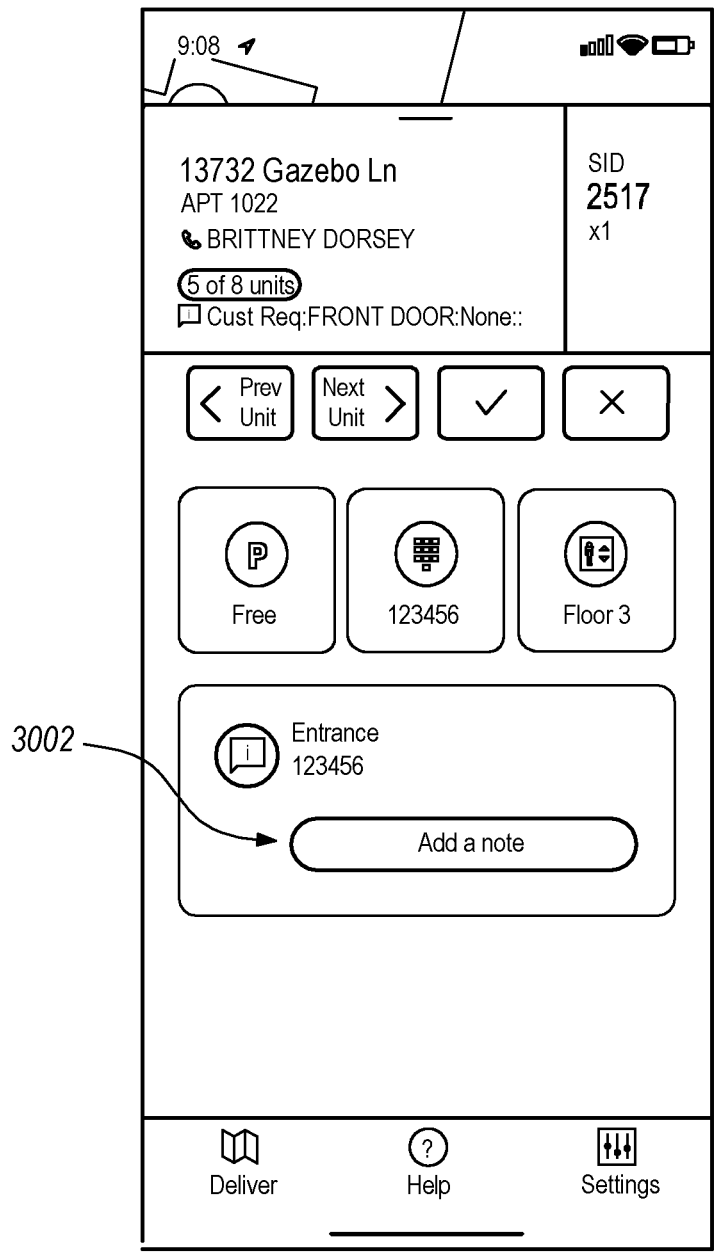
FIG. 30 is an example graphical user interface configured to provide note entering capabilities.

FIG. 30 is an example graphical user interface configured to provide note entering capabilities. The depicted example shows that if a gate code has been already provided for a destination, then the information about the gate code will be displayed in the GUI in the future each time the destination is included in a route. In some embodiments, upon displaying an address corresponding to the destination, an icon labelled with "I" may be displayed, and the gate code may be displayed next to the "I" icon. Furthermore, any additional information pertaining to the destination or the corresponding address may be entered in an additional field 3002.

7. Improvements Provided by Certain Embodiments

In some embodiments, a computer-based, pickup and delivery system is configured to perform a pickup/delivery route optimization and dispatch optimized route information to client applications. The optimization may include optimizing the routes for servicing multiple delivery and/or pickup stops. The optimization may also include optimizing the route navigation along the routes from one location to another. The optimized navigation may include generating a destination mapping throughout, for example, an apartment complex or a business park, and determining convenient locations to park, conveniently located staircases, conveniently located elevators, access codes to the secured gates, lockboxes, and the like.

In some embodiments, a pickup and delivery system groups addresses of pickup/delivery destinations to optimize the service routes using semantic connections between the delivery/pickup addresses and locations. Implementing the grouping provides many improvements over the known approaches. For example, it allows the service drivers to increase a count of delivery/pickup stops within an hour because the routes are optimized and include addresses that are semantically connected. Since the routes are optimized and the addresses are grouped based on the semantic connections between the addresses, the drivers traverse, for example, the routes that are as short as possible and that include as many semantically connected locations as possible.

The route optimization may include optimizing various aspect of the pickup/delivery service. This may include optimizing a stop-by-stop service, balancing workloads between routes, reducing the time needed to locate a pickup/deliver destination (such as a particular apartment or a suite), reducing the time needed to locate conveniently located parking spots for making a pickup/delivery, reducing the time needed to locate conveniently located staircases, elevators, and the like. This may also include allowing to modify pickup/delivery addresses within routes, making notes about the pickup/delivery destinations, making notes about the routes, and the like. This may also include providing information about security codes necessary to enter secured premises such as apartment complexes, business complexes, and the like.

In some embodiments, a pickup and delivery system is configured to generate and display a user interface for interacting with the system. The user interface may be implemented as a graphical user interface or any other type of interface. The user interface may provide improved interactivity capabilities for providing requests, reviewing and modifying the routes, providing and recording notes and feedback about the destinations along the routes, and providing and recording notes and feedback about the routes and the pickup/delivery services.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 31:
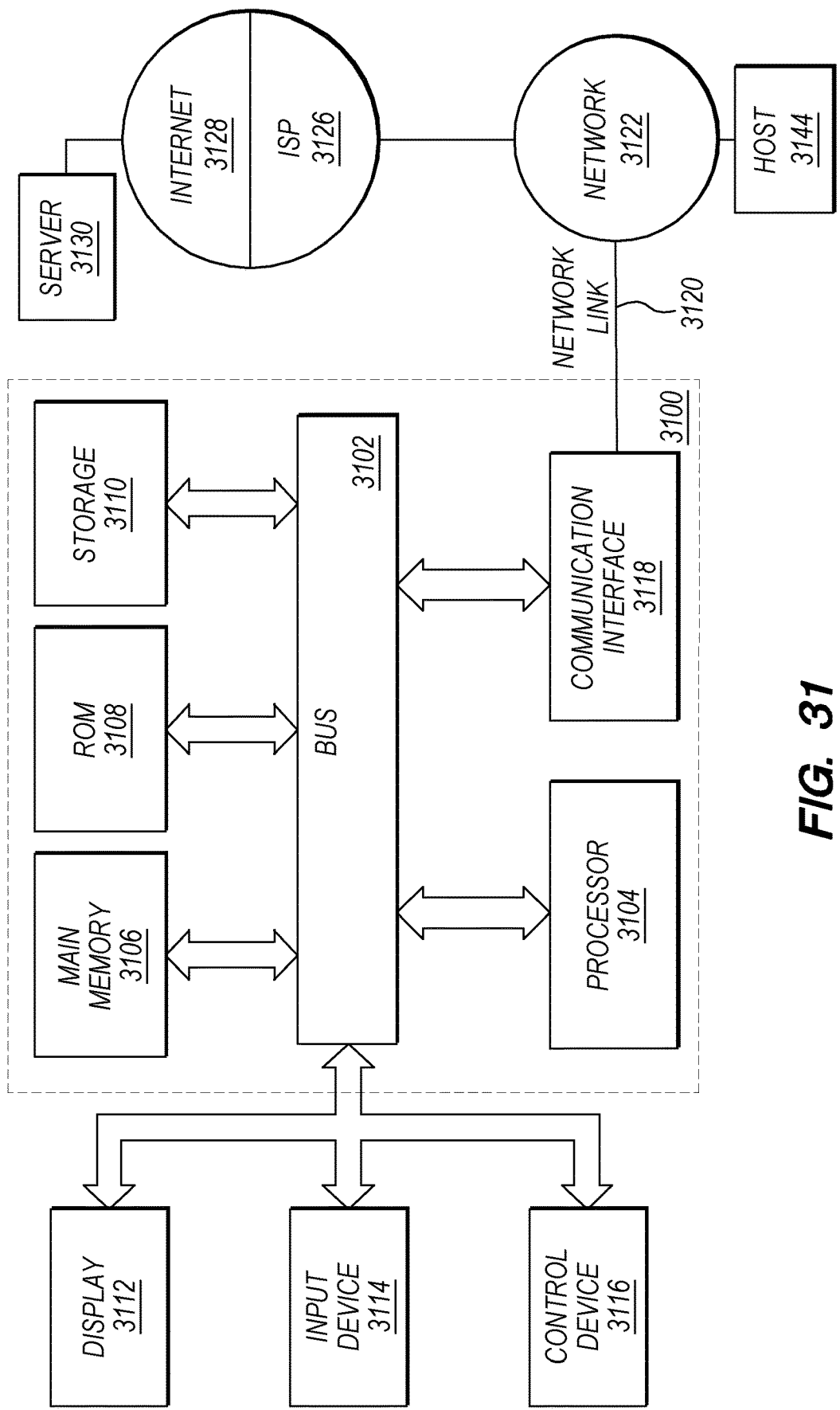
FIG. 31 is an example computer system with which one embodiment may be implemented.

For example, FIG. 31 is a block diagram that illustrates a computer system 3100 upon which an embodiment of the approach may be implemented. Computer system 3100 includes a bus 3102 or other communication mechanism for communicating information, and a hardware processor 3104 coupled with bus 3102 for processing information. Hardware processor 3104 may be, for example, a general purpose microprocessor.

Computer system 3100 also includes a main memory 3106, such as a random access memory (RAM) or other dynamic storage device, coupled to bus 3102 for storing information and instructions to be executed by processor 3104. Main memory 3106 also may be used for storing temporary variables or other intermediate information during execution of instructions to be executed by processor 3104. Such instructions, when stored in non-transitory storage media accessible to processor 3104, render computer system 3100 into a special-purpose machine that is customized to perform the operations specified in the instructions.

Computer system 3100 further includes a read only memory (ROM) 3108 or other static storage device coupled to bus 3102 for storing static information and instructions for processor 3104. A storage device 3110, such as a magnetic disk, optical disk, or solid-state drive is provided and coupled to bus 3102 for storing information and instructions.

Computer system 3100 may be coupled via bus 3102 to a display 3112, such as a cathode ray tube (CRT), for displaying information to a computer user. An input device 3114, including alphanumeric and other keys, is coupled to bus 3102 for communicating information and command selections to processor 3104. Another type of user input device is cursor control 3116, such as a mouse, a trackball, or cursor direction keys for communicating direction information and command selections to processor 3104 and for controlling cursor movement on display 3112. This input device typically has two degrees of freedom in two axes, a first axis (e.g., x) and a second axis (e.g., y), that allows the device to specify positions in a plane.

Computer system 3100 may implement the techniques described herein using customized hard-wired logic, one or more ASICs or FPGAs, firmware and/or program logic which in combination with the computer system causes or programs computer system 3100 to be a special-purpose machine. According to one embodiment, the techniques herein are performed by computer system 3100 in response to processor 3104 executing one or more sequences of one or more instructions contained in main memory 3106. Such instructions may be read into main memory 3106 from another storage medium, such as storage device 3110. Execution of the sequences of instructions contained in main memory 3106 causes processor 3104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 3110. Volatile media includes dynamic memory, such as main memory 3106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 3102. Transmission media can also take the form of acoustic or light waves, such as those generated during radio-wave and infra-red data communications.

Various forms of media may be involved in carrying one or more sequences of one or more instructions to processor 3104 for execution. For example, the instructions may initially be carried on a magnetic disk or solid-state drive of a remote computer. The remote computer can load the instructions into its dynamic memory and send the instructions over a telephone line using a modem. A modem local to computer system 3100 can receive the data on the telephone line and use an infra-red transmitter to convert the data to an infra-red signal. An infra-red detector can receive the data carried in the infra-red signal and appropriate circuitry can place the data on bus 3102. Bus 3102 carries the data to main memory 3106, from which processor 3104 retrieves and executes the instructions. The instructions received by main memory 3106 may optionally be stored on storage device 3110 either before or after execution by processor 3104.

Computer system 3100 also includes a communication interface 3118 coupled to bus 3102. Communication interface 3118 provides a two-way data communication coupling to a network link 3120 that is connected to a local network 3122. For example, communication interface 3118 may be an integrated-services digital network (ISDN) card, cable modem, satellite modem, or a modem to provide a data communication connection to a corresponding type of telephone line. As another example, communication interface 3118 may be a local area network (LAN) card to provide a data communication connection to a compatible LAN. Wireless links may also be implemented. In any such implementation, communication interface 3118 sends and receives electrical, electromagnetic or optical signals that carry digital data streams representing various types of information.

Network link 3120 typically provides data communication through one or more networks to other data devices. For example, network link 3120 may provide a connection through local network 3122 to a host computer 3124 or to data equipment operated by an Internet Service Provider (ISP) 3126. ISP 3126 in turn provides data communication services through the worldwide package data communication network now commonly referred to as the "Internet" 3128. Local network 3122 and Internet 3128 both use electrical, electromagnetic or optical signals that carry digital data streams. The signals through the various networks and the signals on network link 3120 and through communication interface 3118, which carry the digital data to and from computer system 3100, are example forms of transmission media.

Computer system 3100 can send messages and receive data, including program code, through the network(s), network link 3120 and communication interface 3118. In the Internet example, a server 3130 might transmit a requested code for an application program through Internet 3128, ISP 3126, local network 3122 and communication interface 3118.

The received code may be executed by processor 3104 as it is received, and/or stored in storage device 3110, or other non-volatile storage for later execution.

In the foregoing specification, embodiments of the approach have been described with reference to numerous specific details that may vary from implementation to implementation. The specification and drawings are, accordingly, to be regarded in an illustrative rather than a restrictive sense. The sole and exclusive indicator of the scope of the approach, and what is intended by the applicants to be the scope of the approach, is the literal and equivalent scope of the set of claims that issue from this application, in the specific form in which such claims issue, including any subsequent correction.

What is claimed is:

1. A system comprising:
   one or more processors;
   a memory storing instructions which, when executed by the one or more processors, causes performance of:
   receiving data identifying a plurality of destinations;
   determining, based on information relating to the plurality of destinations, that a first destination of the plurality of destinations and a second destination of the plurality of destinations should be grouped and, in response, generating data defining a multiple-stop destination comprising the first destination, the second destination, and a first semantic waypoint;
   causing display, on a graphical user interface of a client computing device, of a map comprising an identifier of a third destination of the plurality of destinations and an identifier of the multiple-stop destination;
   receiving, through the graphical user interface, a selection of the multiple-stop destination and, in response, causing display on the map of an identifier of the first destination, the second destination, and the first semantic waypoint.

2. The system of claim 1, wherein determining that the first destination and the second destination should be grouped comprises determining that the first destination is within a threshold distance of the second destination.

3. The system of claim 1, wherein determining that the first destination and the second destination should be grouped comprises identifying the first semantic waypoint as being associated with the first destination and the second destination.

4. The system of claim 1, wherein the instructions, when executed by the one or more processors, further cause performance of:

identifying a second semantic waypoint for the first destination and the second destination, the second semantic waypoint comprising a drop-off location;

determining whether a particular delivery criterion is satisfied and causing displaying the second semantic waypoint only if the particular delivery criterion is satisfied.

5. The system of claim 4, wherein determining whether the particular delivery criterion is satisfied comprises determining whether a type of item to be delivered to the first destination and the second destination is identified in stored data as a type of item that can be delivered to the drop-off location.

6. The system of claim 4, wherein determining whether the particular delivery criterion is satisfied comprises determining whether the drop-off location is identified in stored data as being available to accept deliveries on a day or time when one or more items are to be delivered to the first destination and the second destination.

7. The system of claim 1, wherein the semantic waypoint comprises one or more of an available parking location or a drop-off location.

8. The system of claim 1, wherein the instructions, when executed by the one or more processors, further cause performance of causing display, with the map comprising the identifier of the first destination and the identifier of the second destination, delivery details for the first destination, one or more first selectable options for indicating completion of delivery at the first destination, delivery details for the second destination, one or more second selectable options for indicating completion of delivery at the second destination, and one or more third selectable options for indicating completion of delivery at the multiple-stop destination.

9. The system of claim 8, wherein the instructions, when executed by the one or more processors, further cause performance of receiving input, through the one or more third selectable options, indicating completion of delivery at the multiple-stop destination and, in response, updating the one or more first selectable options and the one or more second selectable options to indicate completion of delivery at the first destination and the second destination.

10. The system of claim 8, wherein the instructions, when executed by the one or more processors, further cause performance of receiving input, through the one or more first selectable options and the one or more second selectable options, indicating completion of delivery at the first destination and the second destination and, in response, updating the one or more third selectable options to indicate completion of delivery at the multiple-stop destination.

11. A computer-implemented method comprising:

receiving data identifying a plurality of destinations;

determining, based on information relating to the plurality of destinations, that a first destination of the plurality of destinations and a second destination of the plurality of destinations should be grouped and, in response, generating data defining a multiple-stop destination comprising the first destination, the second destination, and a first semantic waypoint;

causing display, on a graphical user interface of a client computing device, of a map comprising an identifier of a third destination of the plurality of destinations and an identifier of the multiple-stop destination;

receiving, through the graphical user interface, a selection of the multiple-stop destination and, in response, causing display on the map of an identifier of the first destination, the second destination, and the first semantic waypoint.

12. The computer-implemented method of claim 11, wherein determining that the first destination and the second destination should be grouped comprises determining that the first destination is within a threshold distance of the second destination.

13. The computer-implemented method of claim 11, wherein determining that the first destination and the second destination should be grouped comprises identifying the first semantic waypoint as being associated with the first destination and the second destination.

14. The computer-implemented method of claim 11, further comprising:

identifying a second semantic waypoint for the first destination and the second destination, the second semantic waypoint comprising a drop-off location;

determining whether a particular delivery criterion is satisfied and causing displaying the second semantic waypoint only if the particular delivery criterion is satisfied.

15. The computer-implemented method of claim 14, wherein determining whether the particular delivery criterion is satisfied comprises determining whether a type of item to be delivered to the first destination and the second destination is identified in stored data as a type of item that can be delivered to the drop-off location.

16. The computer-implemented method of claim 14, wherein determining whether the particular delivery criterion is satisfied comprises determining whether the drop-off location is identified in stored data as being available to accept deliveries on a day or time when one or more items are to be delivered to the first destination and the second destination.

17. The computer-implemented method of claim 11, wherein the semantic waypoint comprises one or more of an available parking location or a drop-off location.

18. The computer-implemented method of claim 11, further comprising causing display, with the map comprising the identifier of the first destination and the identifier of the second destination, delivery details for the first destination, one or more first selectable options for indicating completion of delivery at the first destination, delivery details for the second destination, one or more second selectable options for indicating completion of delivery at the second destination, and one or more third selectable options for indicating completion of delivery at the multiple-stop destination.

19. The computer-implemented method of claim 18, further comprising receiving input, through the one or more third selectable options, indicating completion of delivery at the multiple-stop destination and, in response, updating the one or more first selectable options and the one or more second selectable options to indicate completion of delivery at the first destination and the second destination.

20. The computer-implemented method of claim 18, further comprising receiving input, through the one or more first selectable options and the one or more second selectable options, indicating completion of delivery at the first destination and the second destination and, in response, updating the one or more third selectable options to indicate completion of delivery at the multiple-stop destination.

* * * * *